US012754202B2

(12) United States Patent
Shirasaka et al.

(10) Patent No.: US 12,754,202 B2
(45) Date of Patent: Oct. 6, 2026

(54) DETERMINATION SYSTEM, DETERMINATION METHOD, DETERMINATION DEVICE, AND DETERMINATION PROGRAM THAT DETERMINE WHEN A PERSON STARTS A GET-UP MOTION

(71) Applicant: SEKISUI CHEMICAL CO., LTD., Osaka (JP)

(72) Inventors: Yasuyuki Shirasaka, Osaka (JP); Tetsuhiro Katou, Osaka (JP); Yuuta Katsurayama, Osaka (JP); Yuri Hirono, Osaka (JP); Soichiro Takeuchi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 189 days.

(21) Appl. No.: 18/692,947

(22) PCT Filed: Sep. 20, 2022

(86) PCT No.: PCT/JP2022/034958
§ 371 (c)(1),
(2) Date: Oct. 8, 2024

(87) PCT Pub. No.: WO2023/048132
PCT Pub. Date: Mar. 30, 2023

(65) Prior Publication Data

US 2025/0102536 A1 Mar. 27, 2025

(30) Foreign Application Priority Data

Sep. 22, 2021 (JP) ................................ 2021-154639

(51) Int. Cl.
*G08B 21/00* (2006.01)
*G01P 13/00* (2006.01)

(52) U.S. Cl.
CPC .................................. *G01P 13/00* (2013.01)

(58) Field of Classification Search
CPC .......... G01P 13/00; A61B 5/02; A61B 5/1116; A61B 5/6892; A61B 5/113; A61B 5/11;
(Continued)

(56) References Cited

U.S. PATENT DOCUMENTS

2012/0053480 A1* 3/2012 Ueda .................. A61B 5/7228 600/521
2012/0056747 A1* 3/2012 Stadlthanner .......... G08B 21/22 702/41
2014/0358017 A1* 12/2014 Op Den Buijs ... A61B 5/02444 600/508
2019/0167202 A1 6/2019 Akatsu et al.
(Continued)

FOREIGN PATENT DOCUMENTS

CN 109475324 3/2019
CN 111417343 7/2020
(Continued)

OTHER PUBLICATIONS

International Search Report (ISR) issued Nov. 8, 2022 in International (PCT) Application No. PCT/JP2022/034958.
Extended European Search Report issued Apr. 11, 2025 in corresponding European Patent Application No. 22872884.6.

*Primary Examiner* — Mark S Rushing
(74) *Attorney, Agent, or Firm* — Wenderoth, Lind & Ponack, L.L.P.

(57) ABSTRACT

A determination system, a determination device, a determination method and a determination program are provided, which are capable of notifying a start of a get-up motion by a subject person. A detection device detects a wave motion generated by the subject person and outputs an electrical signal based on the detected wave motion. A determination device 2 determines whether a signal value of the electrical
(Continued)

signal that is detected by the detection device satisfies or not a state determination condition that a period of time when the signal value is not less than a predetermined upper limit threshold value or not more than a predetermined lower limit threshold value exceeds a predetermined time threshold value. When it is determined that the state determination condition is satisfied, the determination device 2 determines that the subject person starts the get-up motion to move from a lying position to a sitting position.

20 Claims, 16 Drawing Sheets

(58) Field of Classification Search
CPC .................. A61G 7/05; A61G 2200/32; A61G 2200/34; A61G 2203/10; A61G 2203/34; A61G 2203/70; A61H 2201/501; A61H 2201/5043; A61H 2201/5048; A61H 2230/08; A61H 2230/62
USPC .......................................................... 340/670
See application file for complete search history.

(56) References Cited

U.S. PATENT DOCUMENTS

| | | | | |
|---|---|---|---|---|
| 2021/0038146 | A1 * | 2/2021 | Todoroki | A61B 5/6891 |
| 2021/0106256 | A1 | 4/2021 | Kogure et al. | |
| 2022/0029086 | A1 * | 1/2022 | Shimizu | A61B 5/11 |
| 2023/0000394 | A1 | 1/2023 | Shirasaka et al. | |
| 2023/0037703 | A1 | 2/2023 | Kogure et al. | |

FOREIGN PATENT DOCUMENTS

| | | | |
|---|---|---|---|
| JP | 2015-154926 | | 8/2015 |
| JP | 2017-184951 | | 10/2017 |
| JP | 2018-94225 | | 6/2018 |
| JP | 2018094225 | A * | 6/2018 |
| JP | 2018-134424 | | 8/2018 |
| JP | 2019-216961 | | 12/2019 |
| JP | 2020-130879 | | 8/2020 |
| WO | 2018/135050 | | 7/2018 |
| WO | 2021/039288 | | 3/2021 |
| WO | 2021/112131 | | 6/2021 |

* cited by examiner

DETERMINATION SYSTEM, DETERMINATION METHOD, DETERMINATION DEVICE, AND DETERMINATION PROGRAM THAT DETERMINE WHEN A PERSON STARTS A GET-UP MOTION

TECHNICAL FIELD

The present invention relates to a determination system, a determination method, a determination device and a determination program in order to determine a state of a subject person.

BACKGROUND ART

In a facility such as a hospital, a nursing home or a nursing facility, a person in charge (a nurse or a caregiver) looks around the facility to confirm the state of each care recipient (a patient or a resident), for example, whether he/she is in the bed in a patient room or getting out from the bed. In order to support such a patrol work, the Applicant of the present invention has proposed, for example, a living body detection system using a piezoelectric sheet so as to be placed on a bed, which detects whether a care recipient is present or not (see, for example, Patent Document 1).

PRIOR ART DOCUMENT

Patent Document

Patent Document 1: JP 2015-154926 A

SUMMARY OF THE INVENTION

Problem to be Solved by the Invention

Patent Document 1 proposes an excellent living body detection system. However, for the purpose of further enriching the quality of care and/or nursing care, now there is a demand for determining how the state of a subject person such as a care recipient is.

The present invention was made in consideration of the above circumstances, a principal object of which is to provide a determination system to determine a state of a subject person.

Also, another object of the present invention is to provide a determination method using the determination system of the present invention.

Furthermore, another object of the present invention is to provide a determination device used in the determination system of the present invention.

Furthermore, another object of the present invention is to provide a determination program to realize the determination device of the present invention.

Means for Solving the Problem

In order to solve the above problem, a determination system disclosed in the present invention includes: a detection section detecting a wave motion generated by a subject person and outputting an electrical signal based on the detected wave motion; and a determination section determining that the subject person starts a get-up motion when a signal value of the electrical signal that is output from the detection section satisfies a state determination condition that a period of time when the signal value is not less than a predetermined upper limit threshold value or not more than a predetermined lower limit threshold value exceeds a predetermined time threshold value.

Also in the above-described determination system, the determination section determines that the subject person starts the get-up motion in which a body position of the subject person moves from a lying position to a sitting position when the body position of the subject person satisfies the state determination condition from a state in which it is determined that the subject person is in the lying position.

Also in the above-described determination system, the signal value is a value according to a signal waveform that maintains a shape of a waveform of the electrical signal output from the detection section.

Also in the above-described determination system, the signal value is a value obtained by removing hum noise from the electrical signal output from the detection section.

Also in the above-described determination system, the signal value is a value according to a signal waveform that is obtained by transmitting an electrical signal in a frequency band of 4 Hz or less out of electrical signals output from the detection section.

Also in the above-described determination system, the signal value is a value as a moving average of electrical signals output from the detection section, and the moving average is taken for the period of 5 seconds or less.

Also in the above-described determination system, the electrical signal output from the detection section is an analog electrical signal, and the signal value is a value according to a digital electrical signal converted from the analog electrical signal.

Also in the above-described determination system, the detection section includes a piezoelectric sensor formed in a sheet shape.

Also, a determination method disclosed in the present invention includes the steps of: detecting a wave motion generated by a subject person and thus outputting an electrical signal based on the detected wave motion, which are performed by a detection section; and determining whether a signal value of the electrical signal that is output from the detection section satisfies or not a state determination condition that a period of time when the signal value is not less than a predetermined upper limit threshold value or not more than a predetermined lower limit threshold value exceeds a predetermined time threshold value.

Also in the above-described determination method, it is determined that the subject person starts the get-up motion in which a body position of the subject person moves from a lying position to a sitting position when the body position of the subject person satisfies the state determination condition from a state in which it is determined that the subject person is in the lying position.

Also in the above-described determination method, the signal value is a value according to a signal waveform that maintains a shape of a waveform of the electrical signal output from the detection section.

Also in the above-described determination method, the signal value is a value obtained by removing hum noise from the electrical signal output from the detection section.

Also in the above-described determination method, the signal value is a value according to a signal waveform that is obtained by transmitting an electrical signal in a frequency band of 4 Hz or less out of electrical signals output from the detection section.

Also in the above-described determination method, the signal value is a value as a moving average of electrical signals output from the detection section, and the moving average is taken for the period of 5 seconds or less.

Also in the above-described determination method, the electrical signal output from the detection section is an analog electrical signal, and the signal value is a value according to a digital electrical signal converted from the analog electrical signal.

Also in the above-described determination method, the detection section includes a piezoelectric sensor formed in a sheet shape.

Also, a determination device disclosed in the present invention includes: an input section receiving input of an electrical signal based on detection of a wave motion generated by a subject person; and a determination section determining whether a signal value of the electrical signal that is received by the input section satisfies or not a state determination condition that a period of time when the signal value is not less than a predetermined upper limit threshold value or not more than a predetermined lower limit threshold value exceeds a predetermined time threshold value.

Also in the above-described determination device, the determination section determines that the subject person starts the get-up motion in which a body position of the subject person moves from a lying position to a sitting position when the body position of the subject person satisfies the state determination condition from a state in which it is determined that the subject person is in the lying position.

Also in the above-described determination device, the signal value is a value according to a signal waveform that maintains a shape of a waveform of the electrical signal received by the input section.

Also in the above-described determination device, the signal value is a value obtained by removing hum noise from the electrical signal received by the input section.

Also in the above-described determination device, the signal value is a value according to a signal waveform that is obtained by transmitting an electrical signal in a frequency band of 4 Hz or less out of electrical signals received by the input section.

Also in the above-described determination device, the signal value is a value as a moving average of electrical signals received by the input section, and the moving average is taken for the period of 5 seconds or less.

Also in the above-described determination device, the electrical signal received by the input section is an analog electrical signal, and the signal value is a value according to a digital electrical signal converted from the analog electrical signal.

Also, a determination program disclosed in the present invention is to cause a computer to determine a state of a subject person. The determination program includes the steps, performed by the computer, of: receiving input of a signal value based on a wave motion generated by the subject person; and determining whether the input signal value satisfies or not a state determination condition that a period of time when the signal value is not less than a predetermined upper limit threshold value or not more than a predetermined lower limit threshold value exceeds a predetermined time threshold value.

Also in the determination step in the above-described determination program, it is determined that the subject person starts the get-up motion in which a body position of the subject person moves from a lying position to a sitting position when the body position of the subject person satisfies the state determination condition from a state in which it is determined that the subject person is in the lying position.

Also in the above-described determination program, the signal value is a value according to a signal waveform that maintains a shape of a waveform of the electrical signal received in the input step.

Also in the above-described determination program, the signal value is a value obtained by removing hum noise from the electrical signal received in the input step.

Also in the above-described determination program, the signal value is a value according to a signal waveform that is obtained by transmitting an electrical signal in a frequency band of 4 Hz or less out of electrical signals received in the input step.

Also in the above-described determination program, the signal value is a value as a moving average of electrical signals received in the input step, and the moving average is taken for the period of 5 seconds or less.

Also in the above-described determination program, the electrical signal received in the input step is an analog electrical signal, and the signal value is a value according to a digital electrical signal converted from the analog electrical signal.

Effects of the Invention

The determination system, the determination method, the determination device and the determination program of the present invention provide excellent effects such as a capability to determine a state of a subject person.

MODE FOR CARRYING OUT THE INVENTION

Application Example

Figure 1:
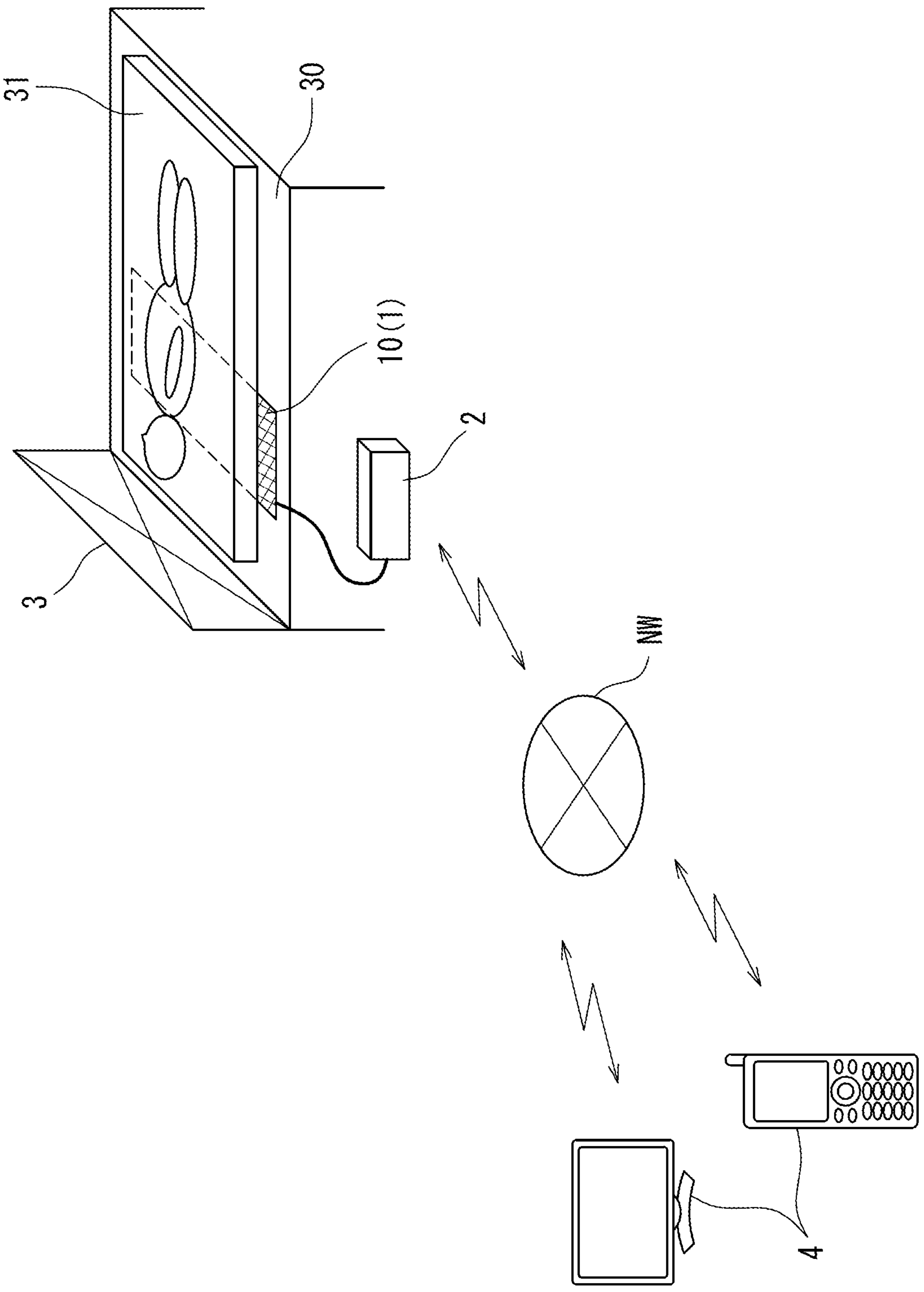
FIG. 1 is a schematic diagram illustrating one example of a configuration of a determination system disclosed in the present invention.

A determination system disclosed in the present invention is a system using various devices such as a detection device and a determination device, and is used for the purpose of detecting a state of a subject person, for example, a breathing status, a heartbeat status, and a posture status. Examples of the posture status include a lying position and a sitting position. The present invention is mainly applied to detection of an initial motion of the subject person to move from the lying position to the sitting position, i.e. a starting state of a get-up motion. Hereinafter, specific examples of devices exemplarily shown in the drawings (such as a detection device 1 and a determination device 2) will be described with reference to the drawings.

Note that the embodiment described below is an example to realize the present invention, and thus it does not limit the technical scope of the present invention.

<Determination System>

FIG. 1 is a schematic diagram exemplarily illustrating a configuration of the determination system disclosed in the present invention. The determination system disclosed in the present invention is to be equipped in a facility such as a hospital, a nursing home or a nursing facility. The facility has rooms such as hospital rooms and care rooms where reside care recipients (subject persons) such as patients or residents who need to be monitored. In these rooms, beds 3 are placed for the care recipients. The facility also has waiting rooms (e.g. nurse's stations) where medical personnel (i.e. staff such as nurses, caregivers and doctors) are on call to care for the care recipients.

The bed 3 used by the care recipient has a bedstead 30. A mattress 31 as bedding is placed on the bedstead 30. A sheet or the like as bedding is also put, as needed, on the mattress 31. A detection device 1 is attached onto the bed 3. The detection device 1 includes a detection section 10 made of a sheet-shaped piezoelectric sensor 10*a* (see FIG. 2). The detection device 1 can detect vibrations in a large frequency range, which are generated from the care recipient as a generation source. Therefore, signals that are output from the detection device 1 are signals made by a plurality of vibrations that has various frequency characteristics and that is overlapped with each other. As one example, the detection device 1 may be capable of acquiring at least one kind of signal among: an inside-body sound signal at a frequency of 20 Hz or more; a heartbeat signal, a breathing vibration signal, and a body motion signal each at a frequency of 20 Hz or less; and a snore signal at a frequency of 20 Hz or more. The inside-body sound signal at a frequency of 20 Hz or more and the snore signal at a frequency of 20 Hz or more can be distinguished from each other based on the frequency component (spectrum). The detection section 10 of the detection device 1 is placed, for example, under the bedding (i.e. the mattress 31 or the sheet) of the bed 3 used by the care recipient. That is, the detection section 10 performs detection on the subject person via the bedding such as mattress 31 and the sheet. FIG. 1 shows an example in which the detection section 10 is placed on the bedstead 30 of the bed 3, and the mattress 31 is placed on the detection section 10. Alternatively, the detection section 10 may be placed on the sheet so as to directly come into contact with the care recipient.

The detection device 1 is connected to the determination device 2. The electrical signal that is output from the detection device 1 is input into the determination device 2 via a communication line. The detection device 1 and the determination device 2 may communicate with each other by wireless communication based on a wireless communication standard such as Bluetooth (registered trademark).

As devices capable of communicating with the determination device 2, various kinds of communication devices 4 are used, which include: a nurse call receiver carried by a nurse; a monitor equipped in the nurse's station; and a mobile phone, a smartphone and a tablet type device that are carried by an external person involved. The determination device 2 and the communication device 4 are communicably connected to each other via a communication network NW such as a wireless LAN (local area network), a wired LAN, a WAN (wide area network), or a dedicated communication line. The determination device 2 transmits various kinds of information such as notification information by determination processing and the like (described later) to the communication device 4 via the communication network NW. The transmission of the various kinds of information from the determination device 2 to the communication device 4 may be a push notification that sends information in substantially real time, or may be a pull notification that accumulates information on a data server on the communication network NW so that the communication device 4 acquires such accumulated pieces of information as necessary. Furthermore, it is possible to develop many other modes such as using the push notification together with the pull notification. The information such as notification information described in the present invention is transmitted by the push notification, since immediacy is required in the present case.

<Configurations of Respective Devices>

Figure 2:
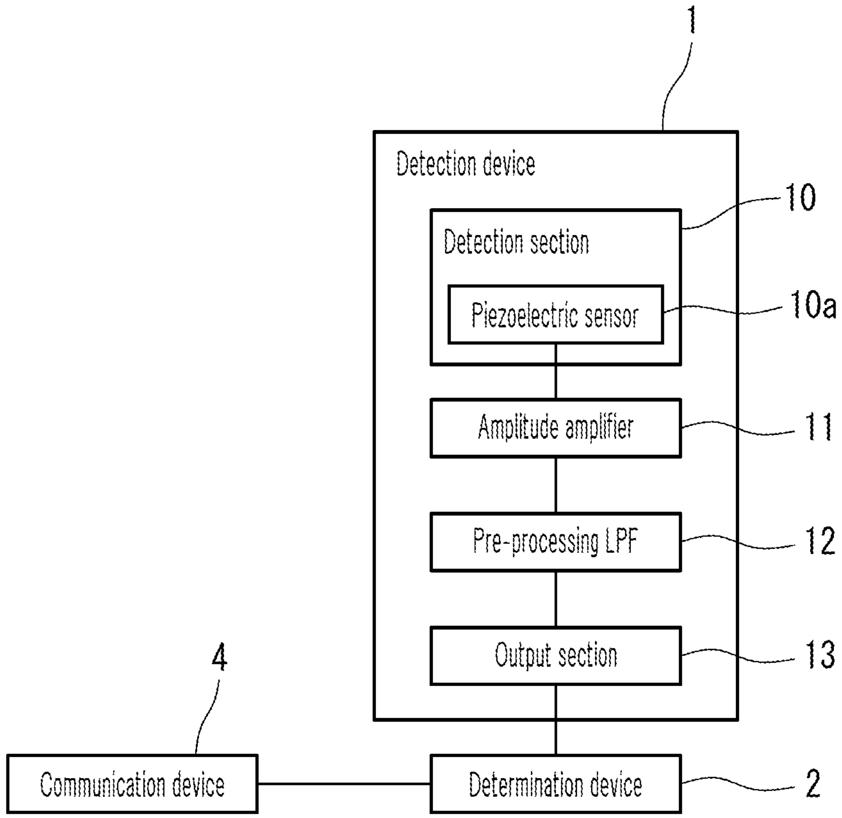
FIG. 2 is a block diagram illustrating one example of configurations of devices such as a detection device provided in the determination system disclosed in the present invention.

Here, hardware configurations of the respective devices provided in the determination system disclosed in the present invention will be described. FIG. 2 is a block diagram illustrating one example of configurations of devices such as the detection device 1 provided in the determination system disclosed in the present invention. Apart from the detection section 10 using the sensor as described above, the detection device 1 includes various components such as: an amplitude amplifier 11; a pre-processing LPF (low pass filter) 12; and an output section 13. In the present invention, an aspect is exemplarily described, in which a sheet-shaped piezoelectric sensor 10*a* is used as an example of the sensor provided in the detection section 10.

Figure 3A:
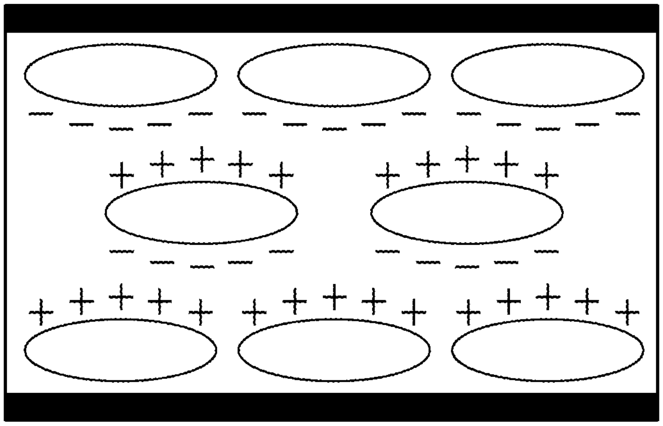
FIG. 3A is a schematic diagram conceptually illustrating one example of a piezoelectric sensor used in a detection section of the detection device provided in the determination system disclosed in the present invention.
Figure 3B:
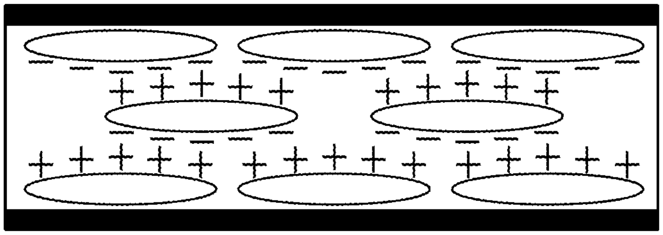
FIG. 3B is a schematic diagram conceptually illustrating one example of the piezoelectric sensor used in the detection section of the detection device provided in the determination system disclosed in the present invention.

The detection section 10 has a function to detect, by the piezoelectric sensor 10*a*, a wave motion such as sound and vibration, and to convert the detected wave motion into an analog electrical signal so as to output the analog electrical signal to the amplitude amplifier 11. FIGS. 3A and 3B are schematic diagrams conceptually illustrating one example of the piezoelectric sensor 10*a* used in the detection section 10 of the detection device 1 provided in the determination system disclosed in the present invention. FIGS. 3A and 3B schematically show, respectively, the cross sections of the piezoelectric sensor 10*a*. FIG. 3A shows a state of the piezoelectric sensor 10*a* to which no pressure is applied, and FIG. 3B shows a state of the piezoelectric sensor 10*a* to which stress is applied. The piezoelectric sensor 10*a* is formed as a sheet using electret foam made of a polyolefin material having an extremely high-density foam structure. When the stress is applied, the piezoelectric sensor 10*a* transits from the state shown in FIG. 3A to the state shown in FIG. 3B, which generates potential difference due to deformation of inside bubbles. The generated potential difference is output, as the analog electrical signal, to the amplitude amplifier 11. As an example of the electret sheet for the piezoelectric sensor 10*a*, an electret sheet described in Patent No. JP 5926860 filed by the Applicant of the present invention is used.

Now referring to the block diagram of FIG. 2 again, the amplitude amplifier 11 is configured, for example, using a signal amplifier that amplifies voltage of the electrical signal. The amplitude amplifier 11 amplifies the amplitude of voltage of the wave motion that is received as the analog electrical signal, and outputs the amplified wave motion to the pre-processing LPF 12. The pre-processing LPF 12 removes the high frequency noise such as hum noise of the amplified wave motion, and outputs the noise-removed wave motion to the output section 13. It is preferable that the pre-processing LPF 12 removes the analog electrical signal in the frequency band exceeding 5 Hz from the viewpoint of maintenance of the shape of the waveform of the electrical signal that is output from the detection section 10. It is further preferable that the pre-processing LPF 12 removes the analog electrical signal in the frequency band exceeding 10 Hz and allows the analog electrical signal in the frequency band of 10 Hz or less to pass through.

The output section 13 outputs the analog electrical signal that is allowed to pass through the pre-processing LPF 12 to the determination device 2.

The amplitude amplifier 11 and the pre-processing LPF 12 are each a circuit to perform pre-processing to an input electrical signal such that the input electrical signal becomes an electrical signal capable of being processed by the determination device 2. The shape of the waveform of the electrical signal is substantially maintained after the amplitude amplification and the removal of the high frequency noise. That is, the detection device 1 outputs, to the determination device 2, the electrical signal having a signal waveform as so-called "raw data" detected by the detection section 10.

Figure 4:
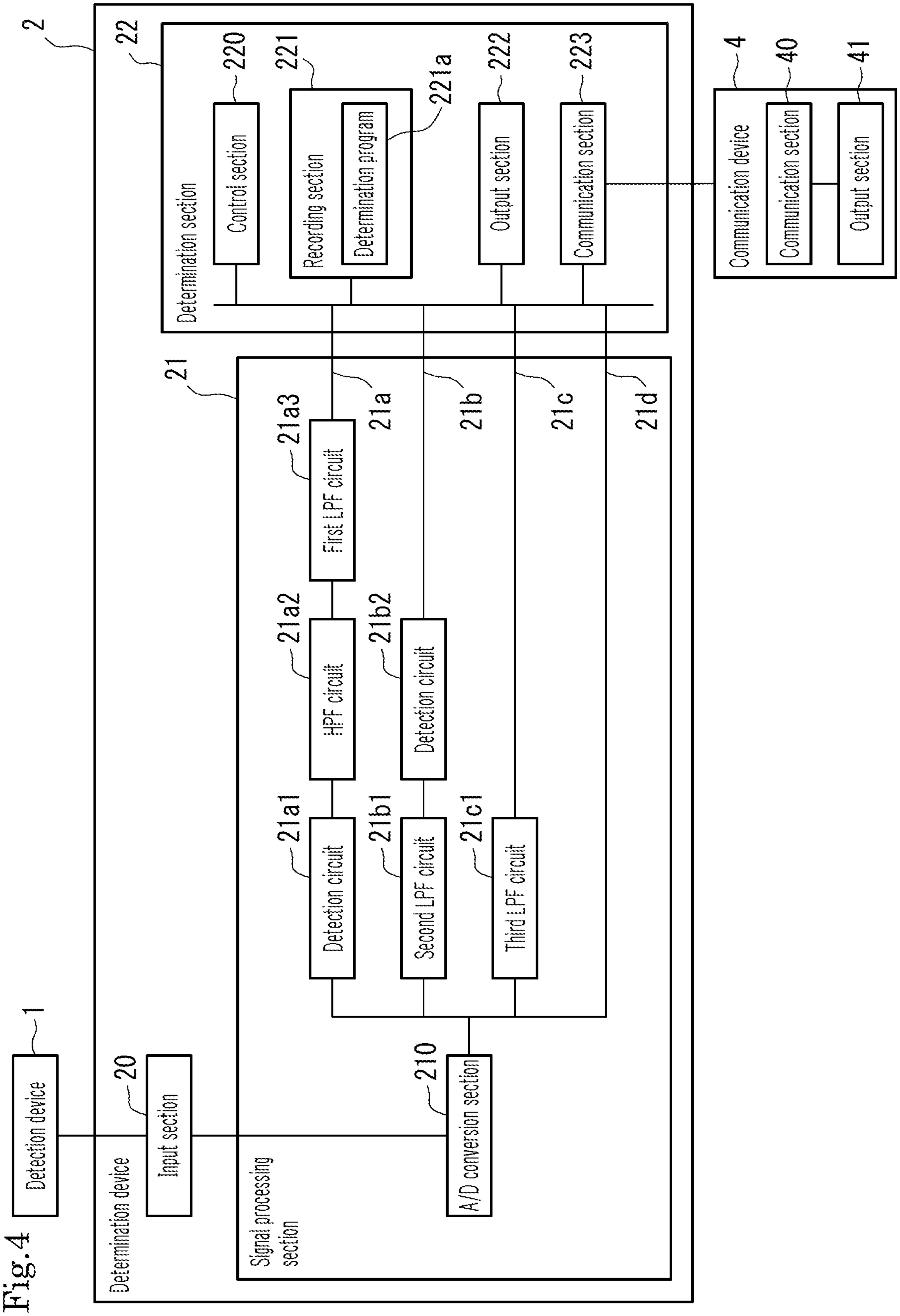
FIG. 4 is a block diagram illustrating one example of configurations of devices such as a determination device and a communication device provided in the determination system disclosed in the present invention.

FIG. 4 is a block diagram illustrating one example of configurations of devices such as the determination device 2 and the communication device 4 provided in the determination system disclosed in the present invention. The determination device 2 is provided with, for example, various electric circuits and microcomputers. The determination device 2 includes: an input section 20; a signal processing section 21; and a determination section 22.

The input section 20 is an input unit to receive input of the analog electrical signal that is output from the detection device 1.

The signal processing section 21 is a unit that performs or does not perform processing to the received electrical signal so as to output the processed/unprocessed electrical signal to the determination section 22. The signal processing section 21 is provided with an A/D conversion section 210 that converts the analog electrical signal received by the input section 20 into a digital electrical signal, and also includes a plurality of routes to process the converted digital electrical signal. The A/D conversion section 210 samples the analog electrical signal at a sampling period of, for example, 100 Hz so as to convert the analog electrical signal into the digital electrical signal.

A first route 21*a* is a route for performing signal processing to detect the heartbeat signal of the subject person. The first route 21*a* includes circuits such as a detection circuit 21*al*, an HPF (high pass filter) circuit 21*a*2, and a first LPF circuit 21*a*3. The HPF circuit 21*a*2 removes, for example, the electrical signals in the frequency band of 0.01 Hz or less. It is more preferable that the HPF circuit 21*a*2 removes the electrical signals in the frequency band of 0.6 Hz or less. When the HPF circuit 21*a*2 removes the electrical signals in the frequency band of 0.01 Hz or less, it allows the electrical signals in the frequency band exceeding 0.01 Hz to pass through. When the HPF circuit 21*a*2 removes the electrical signals in the frequency band of 0.6 Hz or less, it allows the electrical signals in the frequency band exceeding 0.6 Hz to pass through. The first LPF circuit 21*a*3 removes, for example, the electrical signals in the frequency band exceeding 4.0 Hz. It is more preferable that the first LPF circuit 21*a*3 removes the electrical signals in the frequency band exceeding 2.2 Hz. When the first LPF circuit 21*a*3 removes the electrical signals in the frequency band exceeding 4.0 Hz, it allows the electrical signals in the frequency band of 4.0 Hz or less to pass through. When the first LPF circuit 21*a*3 removes the electrical signals in the frequency band exceeding 2.2 Hz, it allows the electrical signals in the frequency band of 2.2 Hz or less to pass through. The electrical signal that passes through the first route 21*a* is output to the determination section 22.

A second route 21*b* is a route for performing signal processing to detect that the subject person is in the middle of doing the get-up motion or that the get-up motion has been finished. The second route 21*b* includes circuits such as a second LPF circuit 21*b*1 and a detection circuit 21*b*2. The second LPF circuit 21*b*1 removes, for example, the electrical signals in the frequency band exceeding 10 Hz. It is more preferable that the second LPF circuit 21*b*1 removes the electrical signals in the frequency band exceeding 1 Hz. When the second LPF circuit 21*b*1 removes the electrical signals in the frequency band exceeding 10 Hz, it allows the electrical signals in the frequency band of 10 Hz or less to pass through. When the second LPF circuit **21*b*1 removes the electrical signals in the frequency band exceeding 1 Hz, it allows the electrical signals in the frequency band of 1 Hz or less to pass through. The electrical signal that passes through the second route 21*b* is output to the determination section 22**.

The third route **21*c* is a route for performing signal processing to detect the breathing signal of the subject person. The third route 21*c* includes circuits such as a third LPF circuit 21*c*1. The third LPF circuit 21*c*1 removes, for example, the electrical signals in the frequency band exceeding 2.0 Hz. It is more preferable that the third LPF circuit 21*cl* removes the electrical signals in the frequency band exceeding 0.5 Hz. When the third LPF circuit 21*cl* removes the electrical signals in the frequency band exceeding 2.0 Hz, it allows the electrical signals in the frequency band of 2.0 Hz or less to pass through. When the third LPF circuit 21*cl* removes the electrical signals in the frequency band exceeding 0.5 Hz, it allows the electrical signals in the frequency band of 0.5 Hz or less to pass through. The electrical signal that passes through the third route 21*c* is output to the determination section 22**.

The fourth route **21*d* is a route for performing signal processing to detect that the subject person starts the get-up motion in which the body position of the subject person moves from the lying position to the sitting position. The fourth route 21*d* outputs the received electrical signal to the determination section 22 without performing any processing. The electrical signal that passes through the fourth route 21*d* is an electrical signal that maintains the shape of the waveform of the digital electrical signal converted by the A/D conversion section 210. Each of the various circuits provided in the signal processing section 21** can be configured by hardware or software, or can also be configured as a hybrid circuit of hardware and software.

The determination section 22 is made by using a microcomputer that is provided with a semiconductor chip such as a VLSI (very large-scale IC). The determination section 22 includes sections such as a control section 220, a recording section 221, an output section 222, and a communication section 223.

The control section 220 includes various circuits such as an information processing circuit, a timing circuit, and a register circuit. The control section 220 is a processor that executes overall control processing.

The recording section 221 is a circuit configured using a non-volatile memory and a volatile memory so as to record various kinds of data such as programs and threshold values. Examples of the programs recorded in the recording section 221 include a determination program **221*a* to perform determination processing. Examples of the threshold values recorded in the recording section 221** include various threshold values such as an upper limit threshold value, a lower limit threshold value, and a time threshold value, which are used in determination processing.

The control section 220 executes respective steps included in the determination program **221*a* recorded in the recording section 221. Thus, the determination device 2 functions to determine the state of the subject person by the digital electrical signal based on the wave motion detected by the detection section 10**.

The output section 222 is an output unit such as a liquid crystal display or a speaker.

The communication section 223 is a communication unit including respective components such as an antenna, a LAN adapter, a control circuit and the like. The communication section 223 performs a wireless communication or a wired communication with the communication device 4 via the communication network NW.

The communication device 4 includes sections such as a communication section 40 that performs communication with the determination device 2 via the communication network NW, and an output section 41 that performs respective outputs. Examples of the outputs from the output section 41 include: light output; image display; audio output; ringing; and vibrating.

<Processing of Respective Devices>

Figure 5:
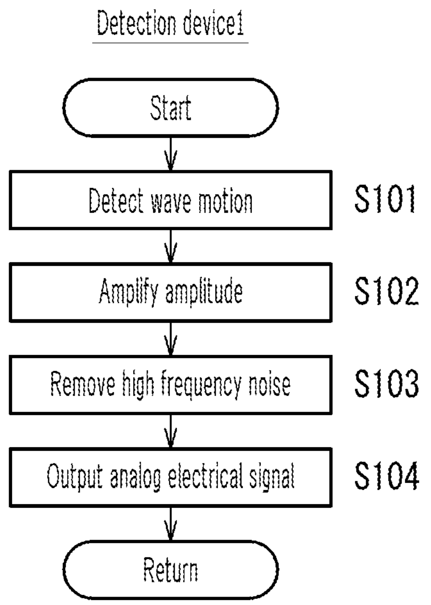
FIG. 5 is a flowchart indicating one example of detection processing of the detection device provided in the determination system disclosed in the present invention.

Here, processing of the respective devices in the determination system disclosed in the present invention will be described. FIG. 5 is a flowchart indicating one example of detection processing of the detection device 1 provided in the determination system disclosed in the present invention. The detection section 10 of the detection device 1 detects, by the piezoelectric sensor **10*a*, a wave motion such as a vibration related to the subject person (S101) so as to convert the detected wave motion into an analog electrical signal. The detection device 1 amplifies, by the amplitude amplifier 11, the amplitude of the analog electrical signal (S102), and also removes, by the pre-processing LPF 12, the high frequency noise (S103). The detection device 1 outputs, by the output section 13, the analog electrical signal to the determination device 2 (S104**).

As described above, the detection device 1 performs the detection processing.

Figure 6:
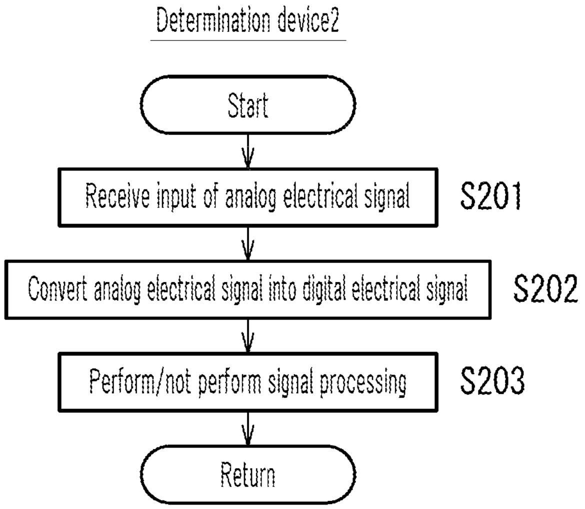
FIG. 6 is a flowchart indicating one example of signal processing of the determination device provided in the determination system disclosed in the present invention.

FIG. 6 is a flowchart indicating one example of signal processing of the determination device 2 provided in the determination system disclosed in the present invention. The determination device 2 receives, by the input section 20, input of the analog electrical signal from the detection device 1 (S201). The signal processing section 21 of the determination device 2 converts, by the A/D conversion section 210, the received analog electrical signal into the digital electrical signal (S202). Furthermore, the signal processing section 21 performs (or does not perform) signal processing to the digital electrical signal (S203) so as to output the processed/unprocessed digital electrical signal to the determination section 22. In step S203, the signal processing section 21 performs the signal processing to each digital electrical signal that passes through the first to third routes **21*a* to 21*c* so as to remove the signals in the specific frequency band, and outputs the processed digital electrical signal to the determination section 22. On the other hand, the signal processing section 21 does not perform the signal processing to the digital electrical signal that passes through the fourth route 21*d* so as to output, to the determination section 22**, the unprocessed digital electrical signal as data that maintains the shape of the signal waveform.

As described above, the detection device 1 performs the signal processing.

Figure 7:
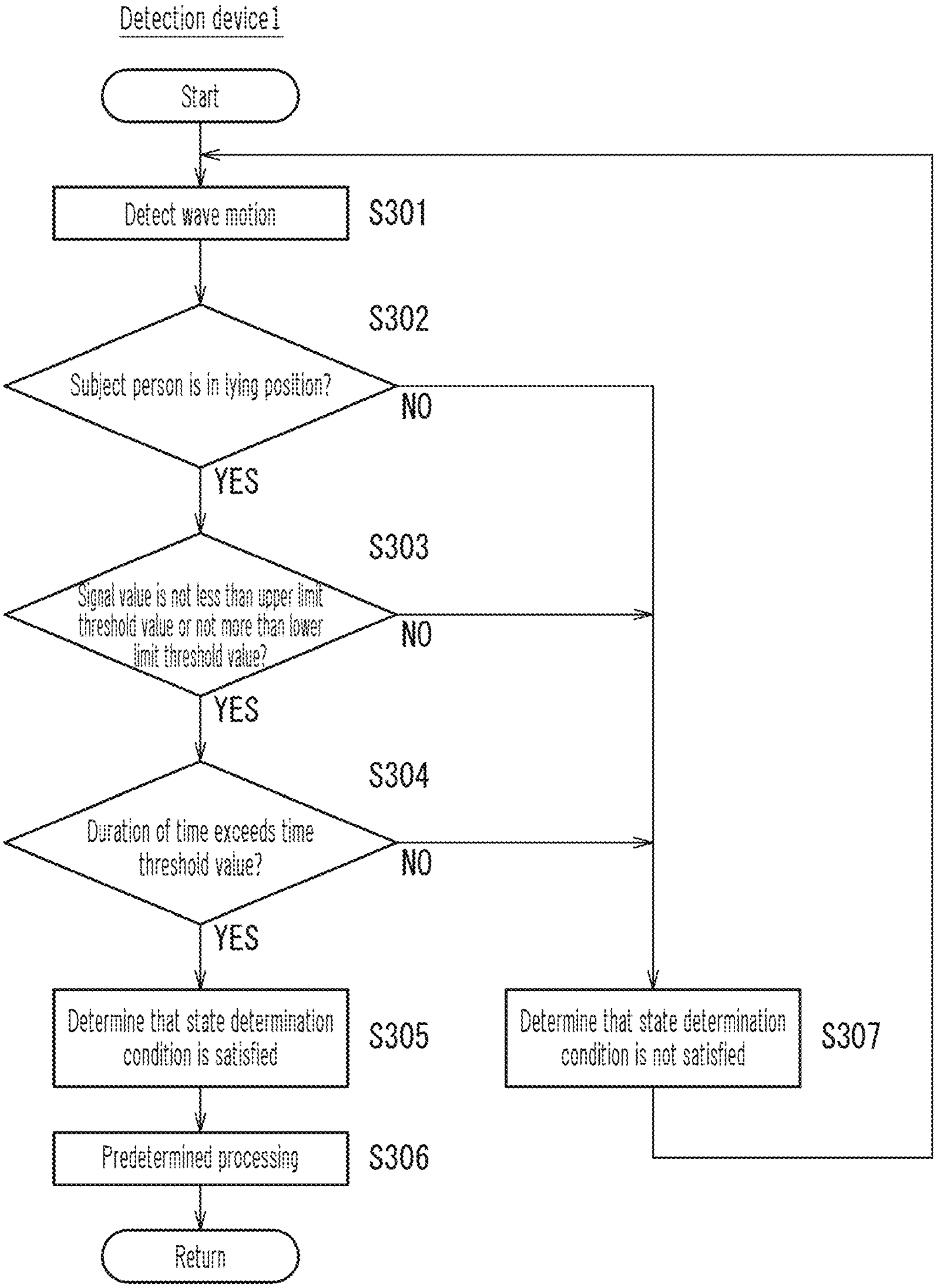
FIG. 7 is a flowchart indicating one example of determination processing of the determination device provided in the determination system disclosed in the present invention.

FIG. 7 is a flowchart indicating one example of determination processing of the determination device 2 provided in the determination system disclosed in the present invention. The determination section 22 of the determination device 2 performs processing to determine the heartbeat status of the subject person based on the digital electrical signal that passes through the first route **21*a*. Also, the determination section 22 performs processing to determine the state of the signal based on the digital electrical signal that passes through the second route 21*b* so as to detect that the subject person is in the middle of doing the get-up motion or that the get-up motion has been finished. Also, the determination section 22 performs processing to determine the breathing status of the subject person based on the digital electrical signal that passes through the third route 21_c_. Furthermore, the determination section 22 performs processing to determine whether the subject person starts the get-up motion to move from the lying position to the sitting position based on the digital electrical signal that passes through the fourth route 21_d_ (i.e. the digital electrical signal that maintains the shape of the waveform of the electrical signal output from the detection section 10). In addition, the determination section 22 performs processing to determine the posture status of the subject person (for example, the lying position and the sitting position) based on the digital electrical signals that pass through the first route 21_a_, the second route 21_b_ and the third route 21_c_ in total. Referring to FIG. 7**, a description will be given on the determination processing to determine whether the get-up motion to move from the lying position to the sitting position is started or not.

The control section 220 provided in the determination section 22 of the determination device 2 performs the determination processing by executing the determination program 221_a_ recorded in the recording section 221. The control section 220 calculates the moving average value of the signal values of the received digital electrical signals that passed through the fourth route 21_d_ (S301). In step S301, the moving average value is calculated, for example, for the period of 5 seconds or less. Regarding the determination of the start of the get-up motion, it is not preferable to prolong the target period for the moving average because in this case the immediacy is required. Also, in the case of the determination processing where the immediacy is considered to be important, the calculation of the moving average in step S301 may be omitted to execute the processing in step 302 and thereafter (described below). In other words, the processing in step S301 is performed when the immediacy is not particularly required, and the higher the request for immediacy becomes, the shorter the target period should be. Thus, when the immediacy is considered to be important, it is preferable to use the signal value of the digital electrical signal without calculating the moving average.

The control section 220 determines whether the state of the subject person is in the lying position or not (i.e. whether the subject person maintains the lying state on the bed 3 or not) (S302). The determination itself on whether the subject person is in the lying position or not is executed based on the digital electrical signals that pass through the other routes such as the first route 21_a_. In step S302, the method for determining the lying position is used, which is described, for example, in WO 2021/112131 filed by the Applicant of the present application.

When it is determined that the state of the subject person is in the lying position in step S302 (S302: YES), the control section 220 determines whether the signal value of the digital electrical signal is not less than a predetermined upper limit threshold value or not more than a predetermined lower limit threshold value referring to the recording section 221 (S303). The upper limit threshold value and the lower limit threshold value are recorded in advance in the recording section 221 as the state determination condition.

When it is determined that the signal value is not less than the predetermined upper limit threshold value or not more than the predetermined lower limit threshold value in step S303 (S303: YES), the control section 220 determines whether the duration of time when the signal value is maintained to be not less than the upper limit threshold value or not more than the lower limit threshold value exceeds a time threshold value recorded in the recording section 221 (S304). In step S304, sometimes the signal value fluctuates momently due to noise or the like. Therefore, even when the signal value becomes momently less than the predetermined upper limit threshold value and also more than the predetermined lower limit threshold value from the state not less than the predetermined upper limit threshold value or not more than the predetermined lower limit threshold value, the control section 220 may be set to determine that the state of the signal value is maintained to be not less than the upper limit threshold value or not more than the lower limit threshold value under the condition that the signal value is not more than a predetermined momentary threshold value. Similarly to the above, when the signal value momently switches from the state not less than the upper limit threshold value to the state not more than the lower limit threshold value and furthermore when the signal value on the way to switch is detected, the control section 220 may be set to determine whether the state of the signal value is maintained to be not less than the upper limit threshold value or not more than the lower limit threshold value based on the momentary threshold value.

The threshold values as the state determination condition are recorded in advance in the recording section 221. The threshold values include: the upper limit threshold value and the lower limit threshold value as the criteria for determination in step S303; and the time threshold value and the momentary threshold value as the criteria for determination in step S304.

When it is determined that the duration of time when the signal value that is maintained to be not less than the upper limit threshold value or not more than the lower limit threshold value exceeds the time threshold value recorded in the recording section 221 in step S304 (S304: YES), the control section 220 determines that the state determination condition is satisfied and that the state of the subject person is a starting state of the get-up motion from the lying position to the sitting position (S305).

When it is determined that the state determination condition is satisfied and that the state of the subject person is the starting state of the get-up motion from the lying position to the sitting position, then the control section 220 performs notification processing to notify the start of the get-up motion (S306). The notification processing in step S306 includes: output processing that outputs the notification information to notify the start of the get-up motion from the output section 222; and transmission processing that transmits the notification information from the communication section 223 to the communication device 4 via the communication network NW. In step S306, recording processing may be performed to record, in the recording section 221, the fact that the state determination condition is satisfied, along with or in place of the notification processing.

The control section 220 determines that the state determination condition is not satisfied and that the state of the subject person is not the starting state of the get-up motion from the lying position to the sitting position (S307) in the following cases: when it is determined that the state of the subject person is not in the lying position in step S302 (S302: NO); when it is determined that the signal value is less than the upper limit threshold value and also more than the lower limit threshold value in step S303 (S303: NO); or when it is determined that the duration of time does not exceed the time threshold value in step S304 (S304: NO).

When it is determined that the state determination condition is not satisfied and the state of the subject person is not the starting state of the get-up motion from the lying position to the sitting position, then the control section 220 captures the signal value of the digital electrical signal as a next object to be determined, and returns to step S301 to repeatedly perform the processing in S301 and thereafter.

The determination processing of the determination device 2 is performed as described above. Here, the determination processing of the determination device 2 was explained, referring to FIG. 7, with respect to the digital electrical signal as the raw data that passes through the fourth route 21*d*. However, this determination processing may also be performed to the digital electrical signals that pass through the first route 21*a* to the third route 21*c*. That is, the determination processing of the determination device 2 may be performed to the respective electrical signals that pass through the first LPF circuit 21*a*3, the second LPF circuit 21*b*1, or the third LPF circuit 21*c*1.

When the communication device 4 receives, by the communication section 40, the notification information transmitted from the determination device 2 via the communication network NW, the communication device 4 outputs, from the output section 41, the received notification information. The output of the notification information is performed as report processing such as light output, image display, audio output, ringing, and vibrating, from various kinds of communication devices 4 such as a nurse call receiver carried by a nurse, a monitor equipped in the nurse's station, and a mobile phone carried by an external person involved. Thus, since the staff such as nurses, caregivers and doctors and/or the persons involved such as families can confirm the notification information that is output from the communication device 4, they can take appropriate measures according to the state of the subject person.

Embodiment

Figure 8:
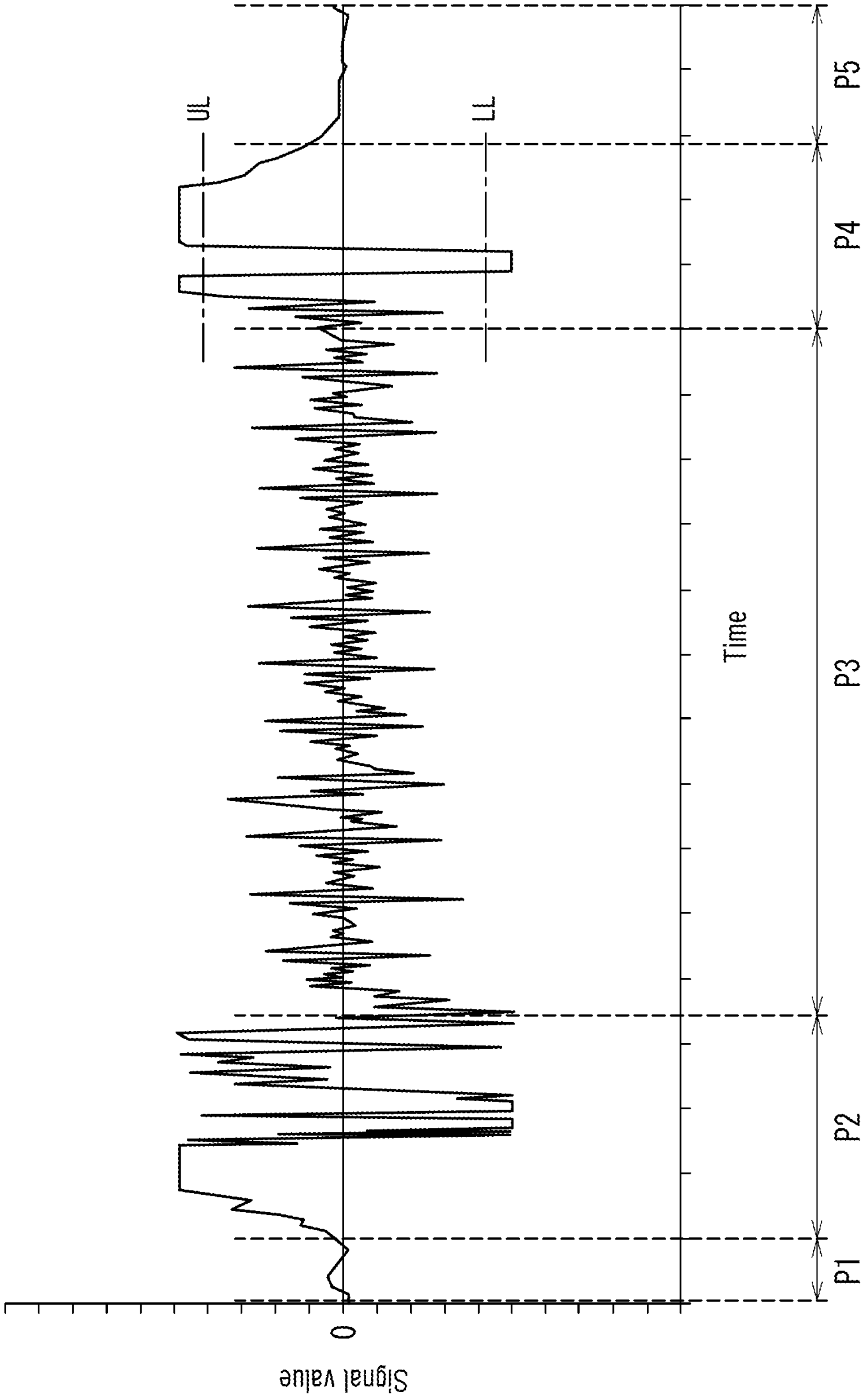
FIG. 8 is a graph indicating one example of a waveform of a digital electrical signal that is input into a determination section of the determination device provided in the determination system disclosed in the present invention.

Here, an embodiment of the determination system disclosed in the present invention is described. FIG. 8 is a graph indicating one example of a waveform of a digital electrical signal that is input into the determination section 22 of the determination device 2 provided in the determination system disclosed in the present invention. In FIG. 8, the graph is plotted with the time on the horizontal axis and the signal value of the digital electrical signal on the vertical axis so as to indicate the chronological change of the signal value of the digital electrical signal that passes through the fourth route 21*d*. In this graph, P1 is a period of time when the subject person is absent (not on the bed), P2 is a period of time when the subject person gets into bed (takes the bed-entry motion), P3 is a period of time when the subject person is taking the lying position, P4 is a period of time when the subject person takes get-up motion from the lying position to the sitting position, and P5 is a period of time when the subject person is taking the sitting position. Also, the dashed-dotted lines in the graph respectively show the upper limit threshold value (referred to as "UL" in the graph) and the lower limit threshold value (referred to as "LL" in the graph).

As exemplarily shown in FIG. 8, the signal value of the digital electrical signal is stably maintained within the range between the upper limit threshold value and the lower limit threshold value for the period P3 in which the subject person after getting in the bed is taking the lying position. Then, the signal value considerably changes between the positive territory and the negative territory in a manner continuously exceeding the range between the upper limit threshold value and the lower limit threshold value for the period P4 in which the subject person takes the get-up motion. Therefore, it is possible to detect the start of the get-up motion by appropriately setting the upper limit threshold value, the lower limit threshold value, and the time threshold value.

Figure 9:
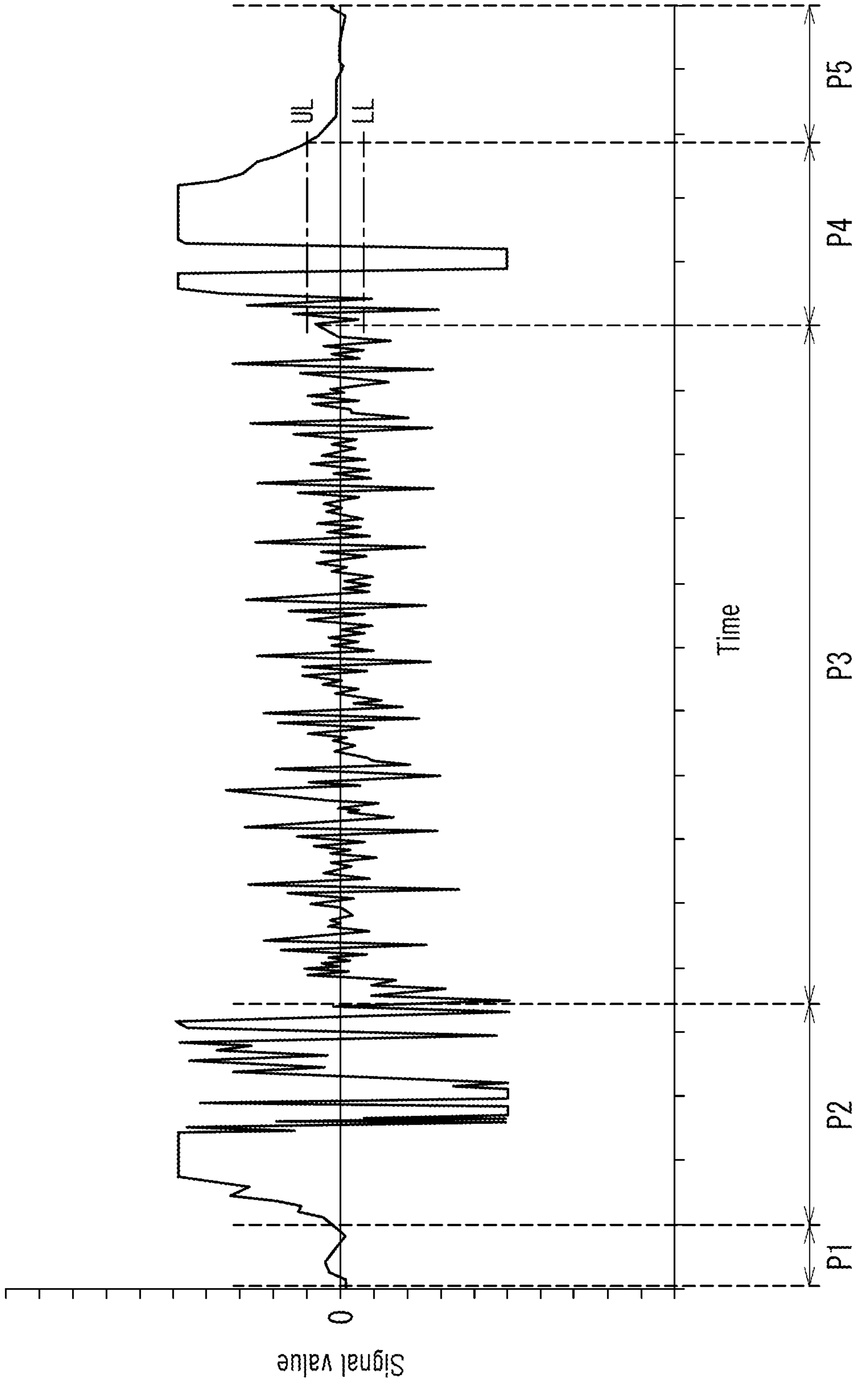
FIG. 9 is a graph indicating one example of a waveform of a digital electrical signal that is input into the determination section of the determination device provided in the determination system disclosed in the present invention.

FIG. 9 is a graph indicating one example of a waveform of a digital electrical signal that is input into the determination section 22 of the determination device 2 provided in the determination system disclosed in the present invention. FIG. 9 shows an example in which the setting of the upper and lower limit threshold values in FIG. 8 is changed such that the upper limit threshold value has a smaller value and the lower limit threshold value has a larger value. By changing the setting of both the limit threshold values as shown in FIG. 9, it is possible to determine more quickly the initial motion for getting up compared to the setting exemplarily shown in FIG. 8. Thus, as exemplarily shown in FIGS. 8 and 9, it is preferable to appropriately change the upper limit threshold value and the lower limit threshold value depending on implementation environments such as the situation where the embodiment is performed and the state of the subject person.

Figure 10:
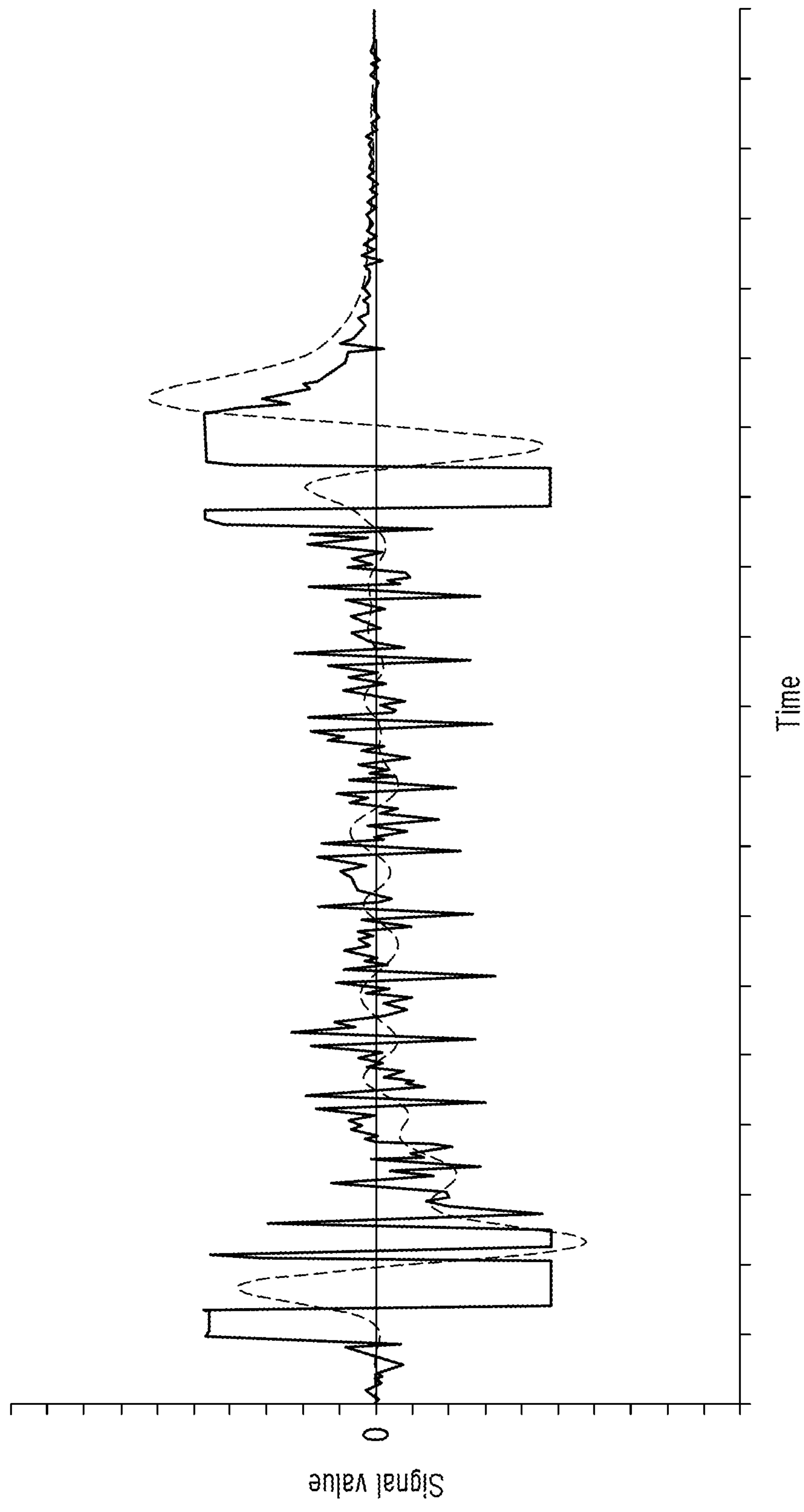
FIG. 10 is a graph indicating one example of a waveform of a digital electrical signal that is input into the determination section of the determination device provided in the determination system disclosed in the present invention.

FIG. 10 is a graph indicating one example of a waveform of a digital electrical signal that is input into the determination section 22 of the determination device 2 provided in the determination system disclosed in the present invention. In FIG. 10, the graph is plotted with the time on the horizontal axis and the signal value of the digital electrical signal on the vertical axis so as to indicate the chronological change of the signal value. In FIG. 10, for the purpose of comparison, the waveform of the digital electrical signal (indicated by the broken line) that passes through the LPF to remove the signal value in the frequency band exceeding 1 Hz is overlapped with the waveform of the digital electrical signal (indicated by the solid line) as the raw data. Compared to the digital electrical signal as the raw data, the waveform of the digital electrical signal that passes through the LPF of 1 Hz has a delayed occurrence of the peak time when the signal value considerably changes between the positive territory and the negative territory, and also has a shorter period of time when the signal value overs the upper limit threshold value and lowers the lower limit threshold value.

Figure 11:
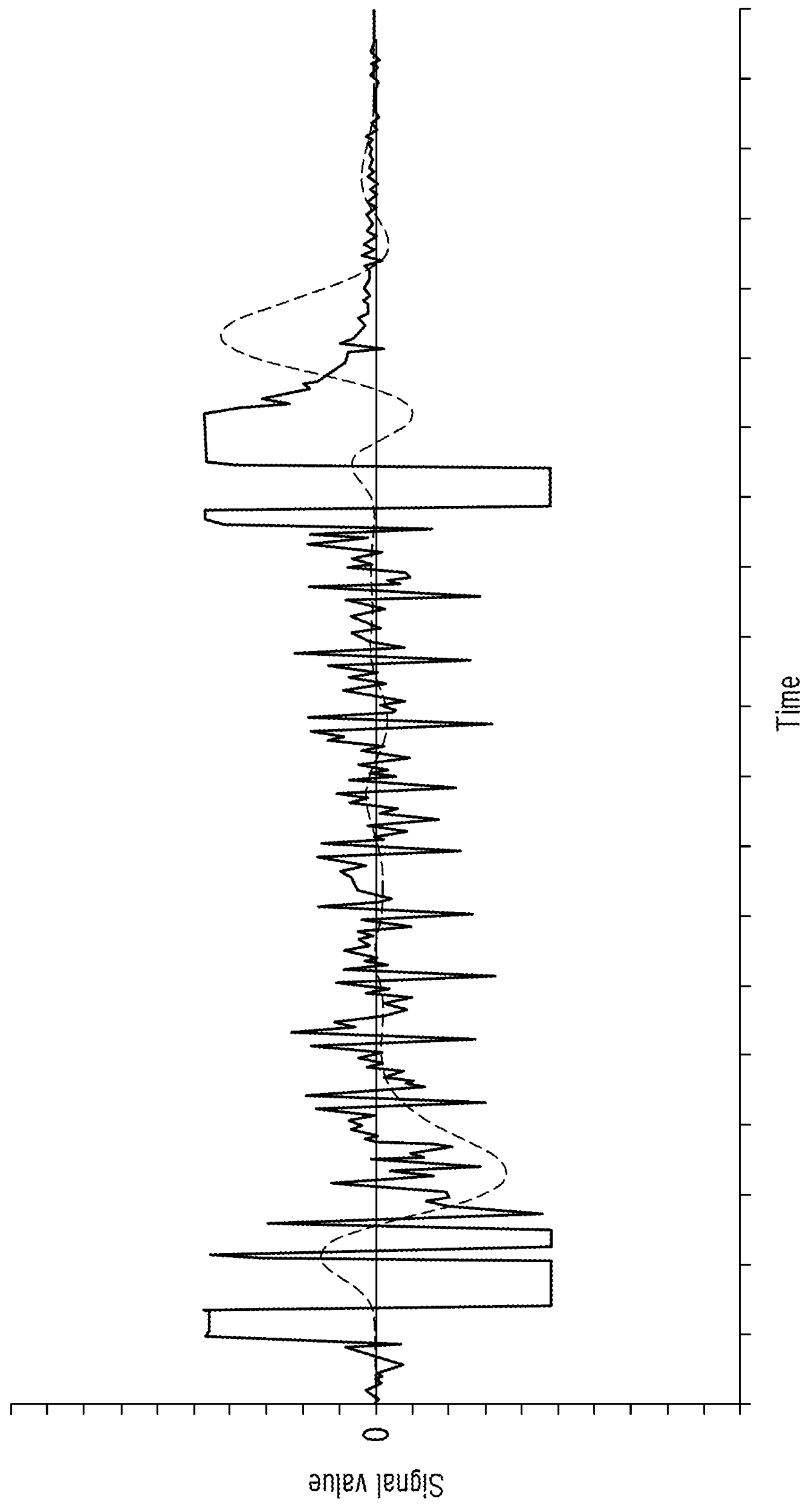
FIG. 11 is a graph indicating one example of a waveform of a digital electrical signal that is input into the determination section of the determination device provided in the determination system disclosed in the present invention.

FIG. 11 is a graph indicating one example of a waveform of a digital electrical signal that is input into the determination section 22 of the determination device 2 provided in the determination system disclosed in the present invention. In FIG. 11, the graph is plotted with the time on the horizontal axis and the signal value of the digital electrical signal on the vertical axis so as to indicate the chronological change of the signal value. In FIG. 11, for the purpose of comparison, the waveform of the digital electrical signal (indicated by the broken line) that passes through the LPF to remove the signal value in the frequency band exceeding 0.5 Hz is overlapped with the waveform of the digital electrical signal (indicated by the solid line) as the raw data. Compared to the digital electrical signal as the raw data, the waveform of the digital electrical signal that passes through the LPF of 0.5 Hz has a delayed occurrence of a peak time when the signal value considerably changes between the positive territory and the negative territory, and also has a smaller maximum positive value and a smaller maximum negative value.

Figure 12:
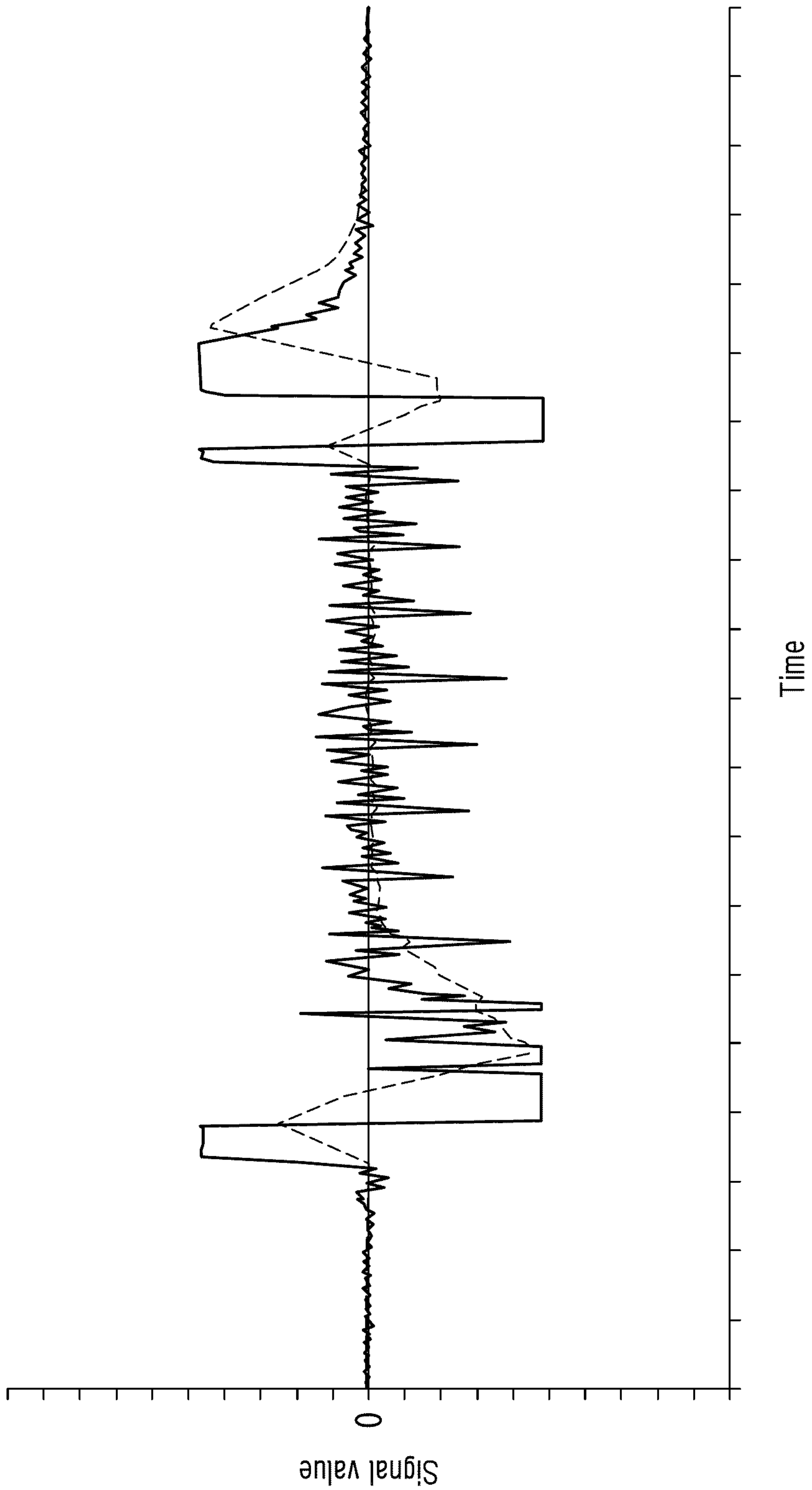
FIG. 12 is a graph indicating one example of a waveform of a digital electrical signal that is input into the determination section of the determination device provided in the determination system disclosed in the present invention.

FIG. 12 is a graph indicating one example of a waveform of a digital electrical signal that is input into the determination section 22 of the determination device 2 provided in the determination system disclosed in the present invention. In FIG. 12, the graph is plotted with the time on the horizontal axis and the signal value of the digital electrical signal on the vertical axis so as to indicate the chronological change of the signal value. In FIG. 12, for the purpose of comparison, the waveform of the digital electrical signal (indicated by the broken line) that is made by calculating the moving average is overlapped with the waveform of the digital electrical signal (indicated by the solid line) as the raw data. The moving average in FIG. 12 is calculated as an average value of 100 times of signal values at 100 Hz, i.e., the calculated value of the moving average for 1 second. Compared to the digital electrical signal as the raw data, the waveform of the moving average for 1 second has a delayed occurrence of the peak time when the signal value considerably changes between the positive territory and the negative territory, and also has a shorter period of time when the signal value overs the upper limit threshold value and lowers the lower limit threshold value.

Figure 13:
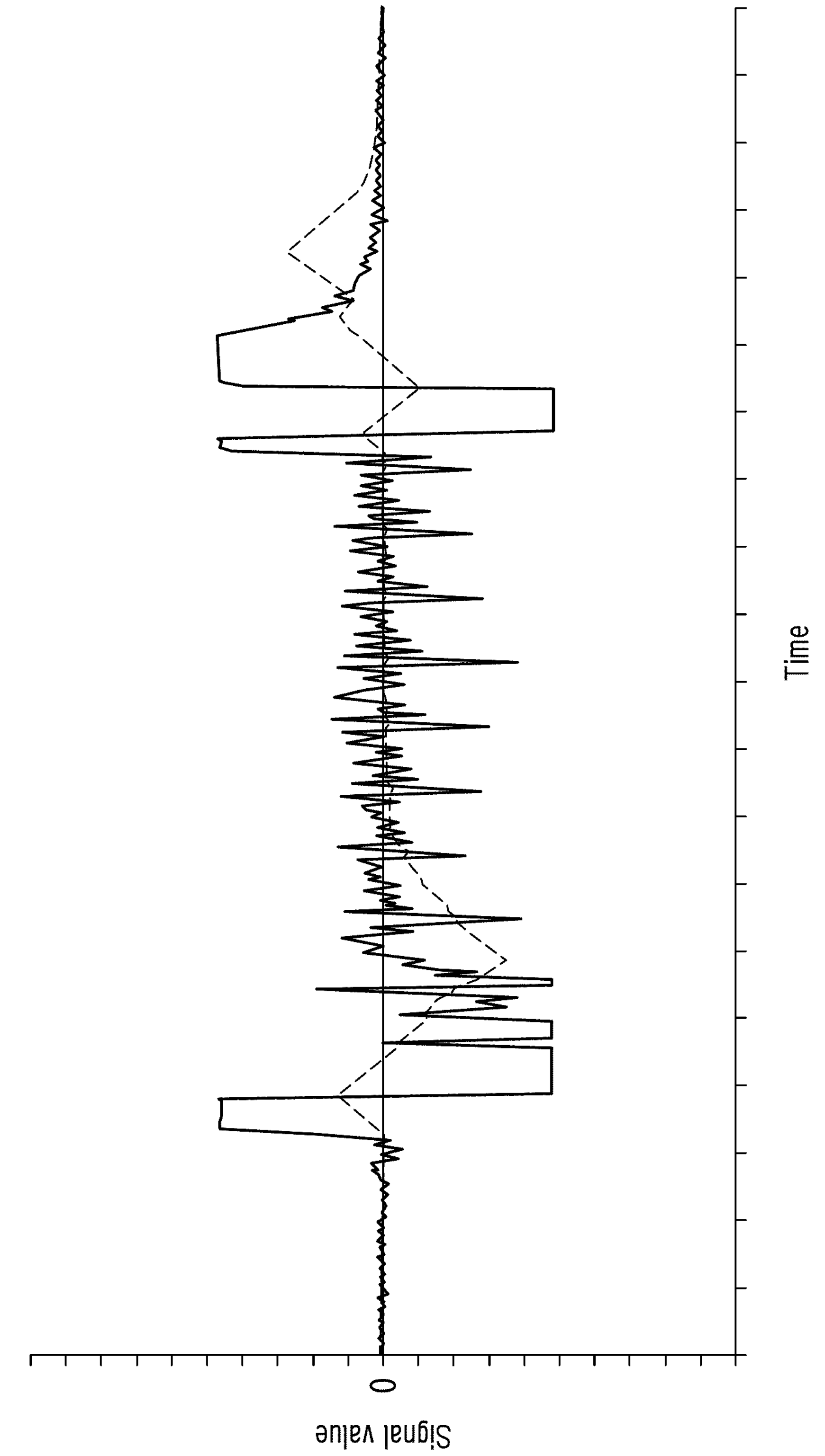
FIG. 13 is a graph indicating one example of a waveform of a digital electrical signal that is input into the determination section of the determination device provided in the determination system disclosed in the present invention.

FIG. 13 is a graph indicating one example of a waveform of a digital electrical signal that is input into the determination section 22 of the determination device 2 provided in the determination system disclosed in the present invention. In FIG. 13, the graph is plotted with the time on the horizontal axis and the signal value of the digital electrical signal on the vertical axis so as to indicate the chronological change of the signal value. In FIG. 13, for the purpose of comparison, the waveform of the digital electrical signal (indicated by the broken line) that is made by calculating the moving average is overlapped with the waveform of the digital electrical signal (indicated by the solid line) as the raw data. The moving average in FIG. 13 is calculated as an average value of 200 times of signal values at 100 Hz, i.e., the calculated value of the moving average for 2 seconds. Compared to the digital electrical signal as the raw data, the waveform of the moving average for 2 seconds has a delayed occurrence of the peak time when the signal value considerably changes between the positive territory and the negative territory, and also has a shorter period of time when the signal value overs the upper limit threshold value and lowers the lower limit threshold value.

As exemplarily shown in FIGS. 8 to 13, it is possible to perform quick determination when using, as a target digital electrical signal of the determination processing, a raw data on the signal waveform that maintains the shape of the waveform of the electrical signal that is output from the detection section 10. As the target digital electrical signal of the determination processing, it is also possible to use the electrical signal such as the digital electrical signal that passes through the LPF and the digital electrical signal as the moving average, as shown in FIGS. 10 to 13.

The configuration of the determination system disclosed in the present invention is not limited to the configuration exemplarily shown in FIG. 1 and the like. The configuration of hardware and the processing by software may be appropriately designed. More specifically, the determination system disclosed in the present invention may be realized as various types of configurations that include at least: a detection function to detect a wave motion generated by the subject person; a signal processing function to perform signal processing to the electrical signal based on the detected wave motion; and a determination function to determine the state of the subject person based on the digital electrical signal.

<System Configuration Variation 1>

Figure 14:
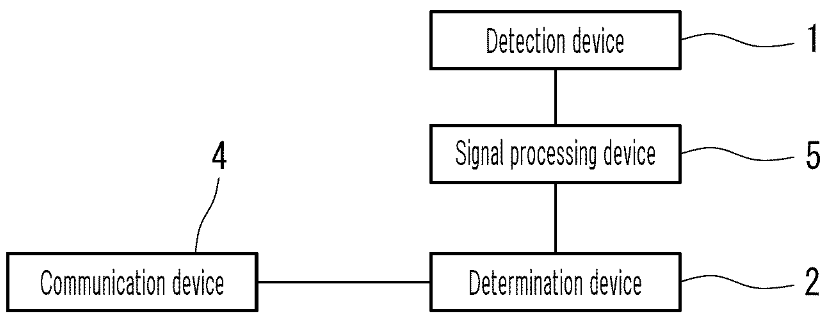
FIG. 14 is a schematic block diagram illustrating one example of a configuration of the determination system disclosed in the present invention.

FIG. 14 is a schematic block diagram illustrating one example of a configuration of the determination system disclosed in the present invention. FIG. 14 shows an outline of a configuration variation of the determination system. The determination system shown in FIG. 14 includes the detection device 1, the determination device 2 and the communication device 4. Furthermore, the determination system includes a signal processing device 5. The signal processing device 5 is an individual device including circuits for signal processing such as the signal processing section 21 usually included in the determination device 2, and is configured using a semiconductor chip such as a VLSI. The signal processing device 5 may further incorporate the pre-processing LPF 12 usually provided in the detection device 1. Also, by making the configuration of the signal processing independent as the signal processing device 5, it is possible to configure the determination device 2 using a general-purpose computer such as a personal computer.

As described above, the determination system according to System Configuration Variation 1 includes the independent signal processing device 5 having a function to process the signal originally performed by the determination device 2.

<System Configuration Variation 2>

Figure 15:
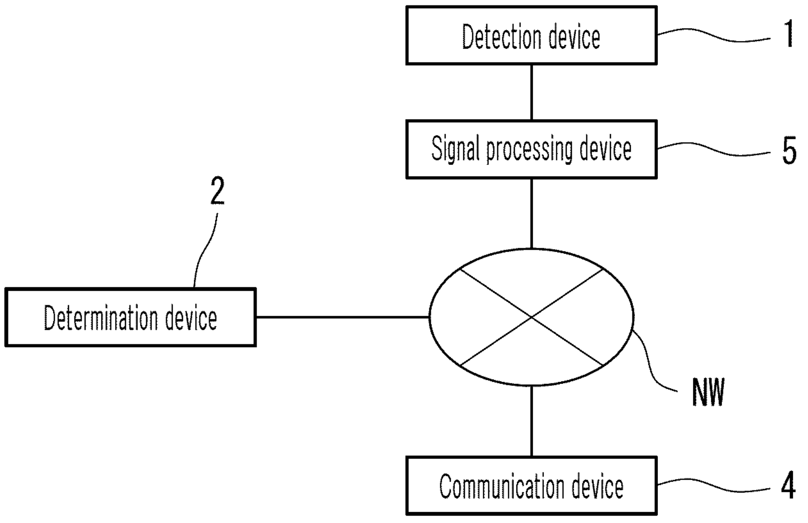
FIG. 15 is a schematic block diagram illustrating one example of a configuration of the determination system disclosed in the present invention.

FIG. 15 is a schematic block diagram illustrating one example of a configuration of the determination system disclosed in the present invention. FIG. 15 further shows an outline of a configuration variation of the determination system. System Configuration Variation 2 includes the determination device 2 configured using a server computer that is connected to the communication network NW. In System Configuration Variation 2, the signal processing device 5 includes circuits for the signal processing such as the signal processing section 21, and performs processing to transmit the processed digital electrical signal to the determination device 2 on the communication network NW. The determination device 2 performs various kinds of processing including the determination processing according to the received digital electrical signal, and transmits notification information based on the determination result to the communication device 4 via the communication network NW. The communication device 4, which is configured using devices such as a nurse call receiver, a monitor and a mobile phone, performs output processing such as information display and audio output to indicate the state of the subject person based on the information indicating the received result.

The configuration of the determination device 2 provided in the determination system disclosed in the present invention is not limited to the configuration exemplarily shown in FIG. 4 and the like, but may be appropriately designed. As described referring to FIG. 4 and the like, the determination device 2 disclosed in the present invention outputs, to the determination section 22, the digital electrical signal that is a target of the determination processing and that passes through the fourth route 21*d* as the so-called raw data that has not been processed and thus maintains the shape of the signal waveform. However, the determination device 2 disclosed in the present invention may also have a configuration in which the electrical signal that passes through the fourth route 21*d* is processed so as to be output to the determination section 22, as exemplarily described below.

<Configuration Variation 1 of Determination Device 2>

Figure 16:
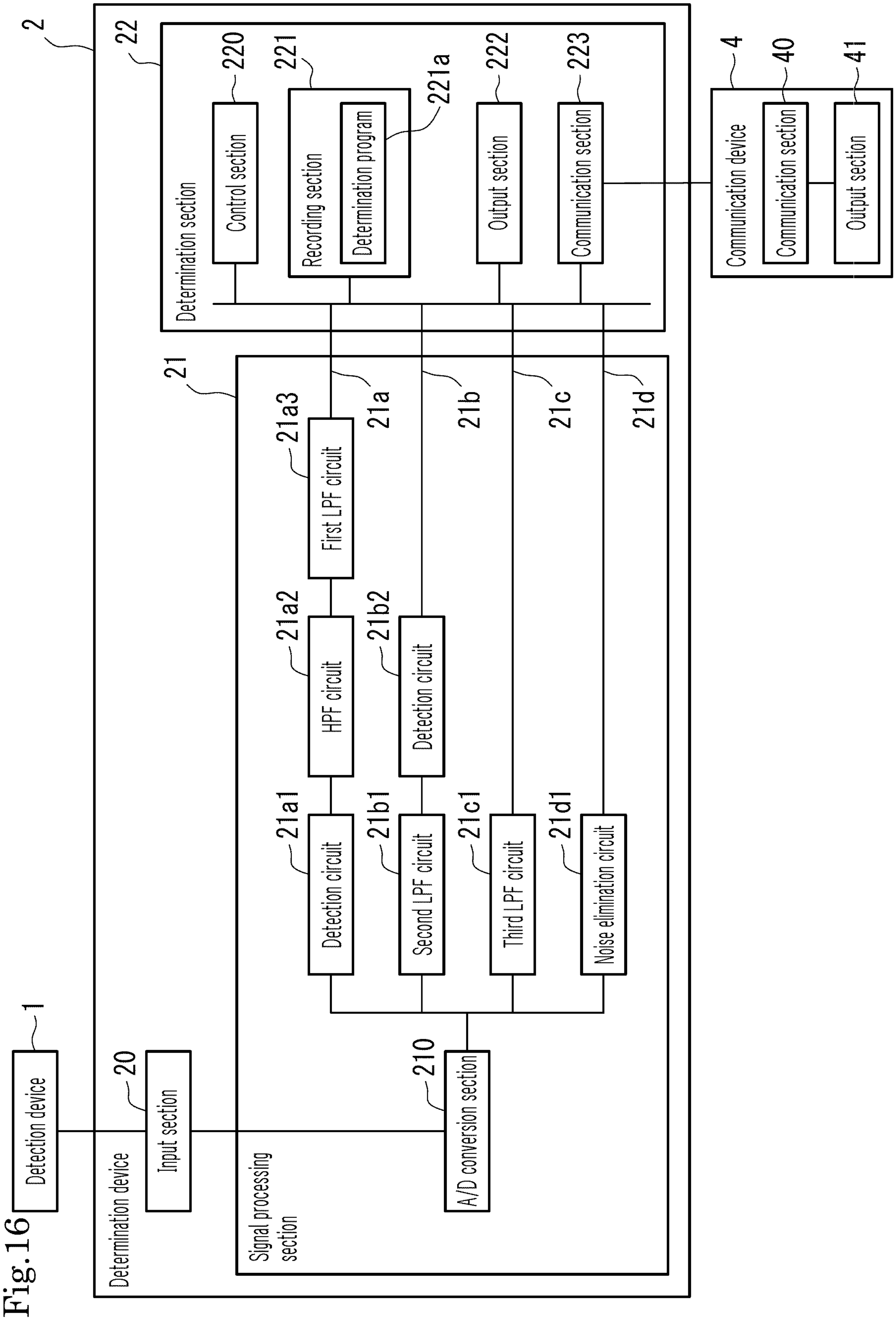
FIG. 16 is a block diagram illustrating one example of configurations of devices such as the determination device provided in the determination system disclosed in the present invention.

FIG. 16 is a block diagram illustrating one example of configurations of devices such as the determination device 2 provided in the determination system disclosed in the present invention. Configuration Variation 1 exemplarily shown in FIG. 16 is a configuration in which the design of the fourth route 21*d* provided in the signal processing section 21 of the determination device 2 is changed from the configuration exemplarily shown in FIG. 4. The configurations other than the fourth route 21*d* are to be referred to the description above, and thus the detailed description thereof is omitted.

In Configuration Variation 1, the fourth route 21*d* includes a noise elimination circuit 21*d*1. The noise elimination circuit 21*d*1 is a circuit to remove hum noise of 10 Hz or more. By providing the noise elimination circuit 21*d*1 on the fourth route 21*d*, it is possible to improve determination accuracy and thus reduce erroneous determination of the determination device 2.

<Configuration Variation 2 of Determination Device 2>

Figure 17:
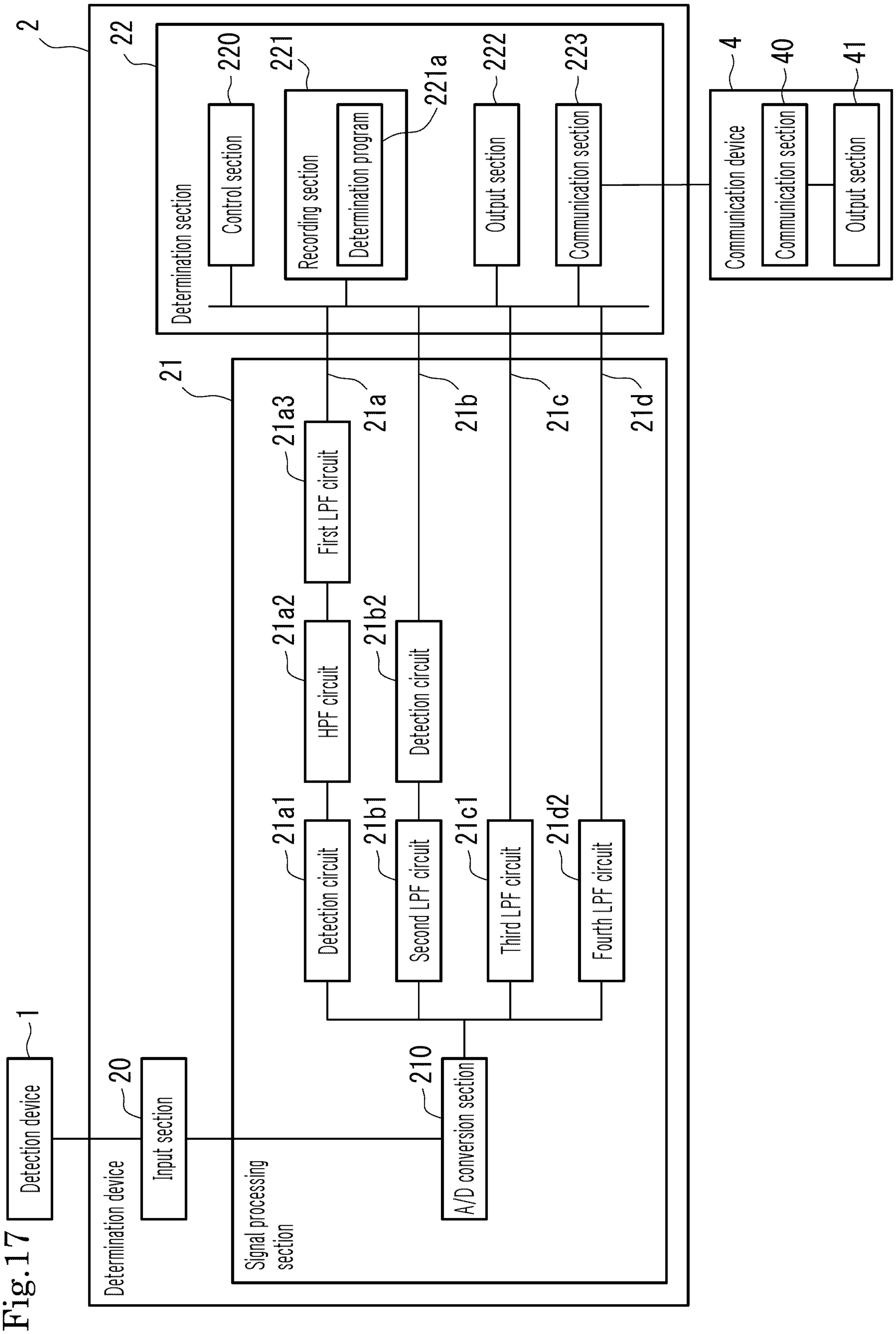
FIG. 17 is a block diagram illustrating one example of configurations of devices such as the determination device provided in the determination system disclosed in the present invention.

FIG. 17 is a block diagram illustrating one example of configurations of devices such as the determination device 2 provided in the determination system disclosed in the present invention. Configuration Variation 2 exemplarily shown in FIG. 17 is a configuration including a fourth LPF circuit 21*d*2 on the fourth route 21*d* in the configuration described in FIG. 4. The configurations other than the fourth route 21*d* are the same as those explained above referring to FIG. 4. The fourth LPF circuit 21*d*2 is a circuit, for example, to remove the electrical signal in the frequency band exceeding 4 Hz and allow the electrical signal in the frequency band of 4 Hz or less to pass through. By providing the fourth LPF circuit 21*d*2 on the fourth route 21*d*, it is possible to improve determination accuracy and thus reduce erroneous determination of the determination device 2. The fourth LPF circuit 21*d*2 removes the electrical signal in the frequency band exceeding 3 Hz, while the third LPF circuit 21*cl* removes the electrical signal in the frequency band exceeding 0.5 Hz. Therefore, the electrical signal that passed through the fourth route 21*d* maintains the shape of the original waveform compared to the electrical signal that passed through the third route 21*c*.

<Configuration Variation 3 of Determination Device 2>

Figure 18:
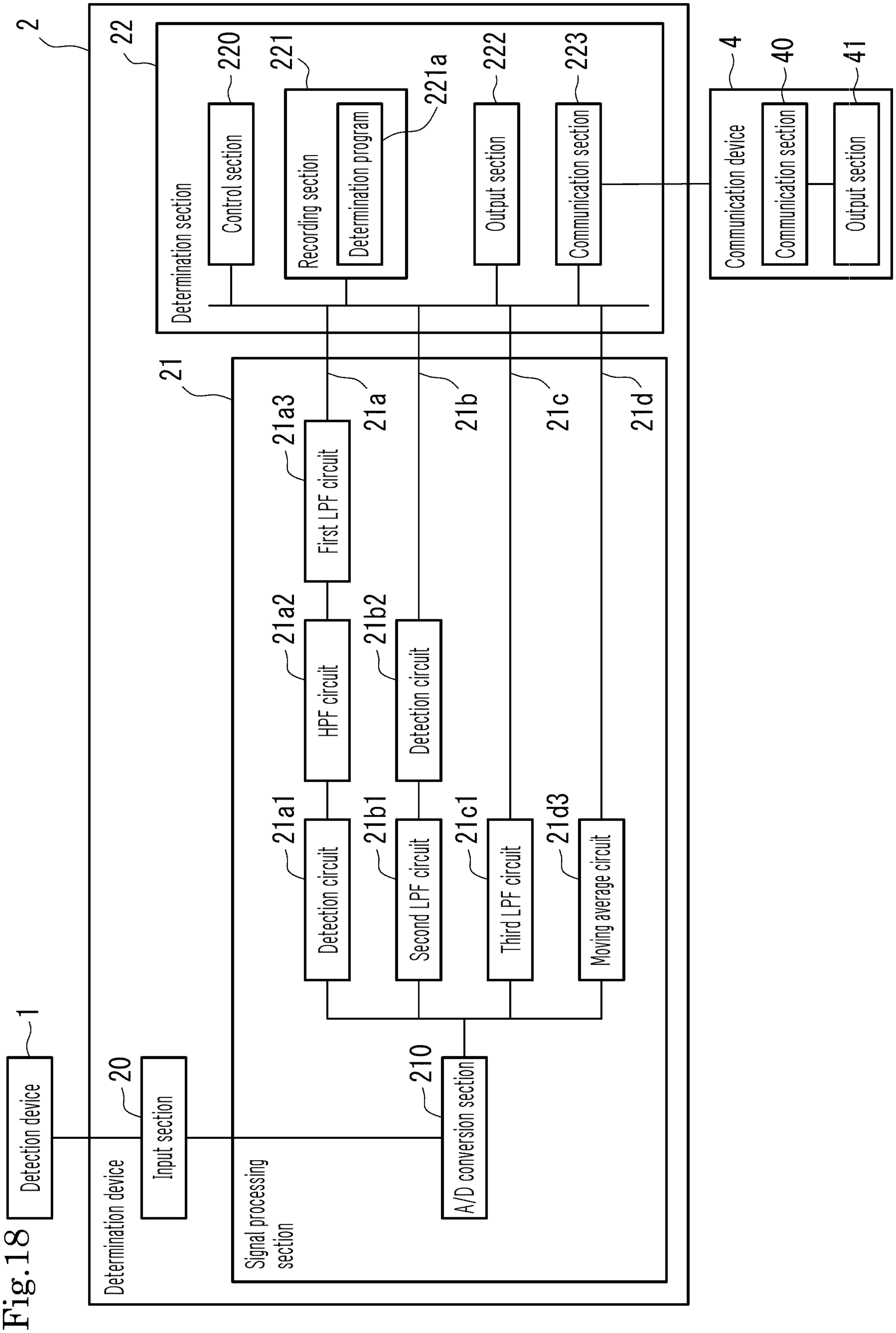
FIG. 18 is a block diagram illustrating one example of configurations of devices such as the determination device provided in the determination system disclosed in the present invention.

FIG. 18 is a block diagram illustrating one example of configurations of devices such as the determination device 2 provided in the determination system disclosed in the present invention. Configuration Variation 3 exemplarily shown in FIG. 18 is a configuration including a moving average circuit 21*d*3 on the fourth route 21*d* in the configuration described in FIG. 4. The configurations other than the fourth route 21*d* are the same as those explained above referring to FIG. 4. The moving average circuit 21*d*3 is a circuit to output a moving average of the input digital electrical signals, which is taken per unit time that is set to 5 seconds or less. By providing the moving average circuit 21*d*3 on the fourth route 21*d*, it is possible to improve determination accuracy and thus reduce erroneous determination of the determination device 2.

Each of Configuration Variations of the determination device 2 as described above (i.e. configuration in which the fourth route 21*d* is provided with the noise elimination circuit 21*d*1, the fourth LPF circuit 21*d*2 or the moving average circuit 21*d*3) may be appropriately combined to be embodied. More specifically, Configuration Variations of the determination device 2 may be variously embodied, for example, as configurations in which: the fourth route 21*d* is provided with the noise elimination circuit 21*d*1 and the fourth LPF circuit 21*d*2; the fourth route 21*d* is provided with the noise elimination circuit 21*d*1 and the moving average circuit 21*d*3; and the like.

As described above, the determination system disclosed in the present invention detects the wave motion of the subject person, and when the period of time in which the value representing the state is not less than the predetermined upper limit threshold value or not more than the predetermined lower limit threshold value exceeds the predetermined time threshold value, the determination system determines that the subject starts the get-up motion, and then performs notification. In this way, it is possible to exert an excellent effect of early detection of the start of the get-up motion that is likely to generate an accident, which makes it possible to take appropriate measures such as assistance.

The present invention should not be limited by the foregoing embodiments, and may be embodied in other forms without departing from the gist or essential characteristics thereof. Therefore, the embodiments described herein are to be considered in all respects as illustrative and not limiting. The scope of the present invention is indicated by the appended claims rather than by the foregoing embodiments, and all modifications and changes that come within the meaning and range of equivalency of the claims are intended to be embraced therein.

For example, in the forgoing embodiment, both of the upper limit threshold value and the lower limit threshold value are set as the state determination condition. However, the present invention may also be embodied in various way other than the above. For example, either the upper limit threshold value or the lower limit threshold value may only be set as the state determination condition.

Also in the foregoing embodiment, the duration of time in which the value representing the state is not less than the upper limit threshold value or not more than the lower limit threshold value is summed up to compare to the time threshold value. However, the present invention may also be embodied in various way other than the above. For example, the time threshold values may be set, respectively, with respect to the upper limit threshold value and the lower limit threshold value.

Also in the foregoing embodiment, the piezoelectric sensor 10*a* is used as the detection section 10 provided in the detection device 1. However, the present invention is not limited thereto. It is also possible to use various sensors such as a microphone sensor, provided that such a sensor can detect the wave motion.

DESCRIPTION OF REFERENCE NUMERALS

1 Detection device
10 Detection section
10*a* Piezoelectric sensor
2 Determination device
22 Determination section
220 Control section
221 Recording section
221*a* Determination program
3 Bed
30 Bedstead
31 Mattress
4 Communication device
5 Signal processing device

The invention claimed is:

1. A determination system for determining a state of a subject person including a person requiring care, the determination system comprising:

a detection device including a detection section that includes a piezoelectric sensor formed in a sheet shape, the detection section detecting a wave motion generated by the subject person and outputting an electrical signal based on the detected wave motion; and a determination device including a processor and a memory, the determination device being configured to receive as input the electrical signal, wherein the detection section is placed on or under a mattress on a bed used by the subject person, and the determination device compares a signal value of the electrical signal that is output from the detection section to a predetermined upper limit threshold value to determine if the signal value is equal to or higher than the predetermined upper limit threshold value and to a predetermined lower limit threshold value to determine if the signal value is equal to or lower than the predetermined lower limit threshold value, and after determining that the subject person is in a lying position based on the signal value, determines that the subject person starts a get-up motion in which a body position of the subject person moves from the lying position to a sitting position when the signal value satisfies a state determination condition that a period of time when the signal value is not less than the predetermined upper limit threshold value or not more than the predetermined lower limit threshold value exceeds a predetermined time threshold value, from a state in which it is determined that the subject person is in the lying position.

2. The determination system according to claim 1, wherein the piezoelectric sensor is formed using electret foam made of a polyolefin material.

3. The determination system according to claim 1, wherein the detection device further includes an amplitude amplifier configured to amplify an amplitude of voltage of the electrical signal, which is an analog signal.

4. The determination system according to claim 3, wherein the detection device further includes a pre-processing low pass filter (LPF) configured to remove a signal in a frequency band exceeding 5 Hz from the electrical signal amplified by the amplitude amplifier.

5. The determination system according to claim 1, wherein the determination device further includes a signal processing section including an A/D conversion section configured to sample the electrical signal, which is an analog signal, at a predetermined sampling period to convert the electrical signal into a digital electrical signal.

6. The determination system according to claim 5, wherein the signal processing section further includes a noise elimination circuit configured to remove hum noise of 10 Hz or more from the digital electrical signal.

7. The determination system according to claim 5, wherein the signal processing section further includes a low pass filter (LPF) circuit configured to remove a signal in a frequency band exceeding 4 Hz from the digital electrical signal and allow a signal in a frequency band of 4 Hz or less to pass through.

8. The determination system according to claim 5, wherein the signal processing section further includes a moving average circuit configured to output a moving average of the digital electrical signal, which is taken per unit time that is set to 5 seconds or less.

9. The determination system according to claim 5, wherein the signal processing section further includes a heartbeat detection route including a detection circuit, a high pass filter (HPF) circuit, and a first low pass filter (LPF) circuit to detect a heartbeat signal of the subject person.

10. The determination system according to claim 9, wherein the HPF circuit removes a signal in a frequency band of 0.6 Hz or less, and the first LPF circuit removes a signal in a frequency band exceeding 4.0 Hz.

11. The determination system according to claim 5, wherein the signal processing section further includes a breathing detection route including a third low pass filter (LPF) circuit to detect a breathing signal of the subject person.

12. The determination system according to claim 11, wherein the third LPF circuit is configured to remove a signal in a frequency band exceeding 2.0 Hz.

13. The determination system according to claim 5, wherein the signal processing section further includes a motion detection route including a second low pass filter (LPF) circuit configured to remove a signal in a frequency band exceeding 10 Hz to detect that the subject person is in a middle of doing the get-up motion or that the get-up motion has been finished.

14. The determination system according to claim 1, further comprising:

a communication device connected to the determination device via a communication network, wherein the determination device transmits notification information indicating the start of the get-up motion to the communication device.

15. The determination system according to claim 14, wherein the communication device is at least one selected from a nurse call receiver, a monitor, or a mobile phone.

16. The determination system according to claim 14, wherein the transmission of the notification information is a push notification that sends the notification information in real time.

17. The determination system according to claim 14, wherein the communication device includes an output section configured to perform at least one output selected from light output, image display, audio output, ringing, and vibrating based on the notification information.

18. The determination system according to claim 1, wherein the memory records a determination program to cause the processor to execute determination processing, and records the predetermined upper limit threshold value, the predetermined lower limit threshold value, and the predetermined time threshold value.

19. The determination system according to claim 5, wherein the A/D conversion section samples the analog electrical signal at a sampling period of 100 Hz.

20. The determination system according to claim 1, wherein the determination device is configured to determine that the state of the signal value being not less than the predetermined upper limit threshold value or not more than the predetermined lower limit threshold value is maintained even when the signal value momentarily fluctuates within a range defined by a predetermined momentary threshold value.

* * * * *